US011628357B2

(12) United States Patent
Kimura et al.

(10) Patent No.: US 11,628,357 B2
(45) Date of Patent: Apr. 18, 2023

(54) STORAGE MEDIUM STORING INFORMATION PROCESSING PROGRAM, INFORMATION PROCESSING APPARATUS, INFORMATION PROCESSING SYSTEM, AND INFORMATION PROCESSING METHOD

(71) Applicant: NINTENDO CO., LTD., Kyoto (JP)

(72) Inventors: Miyuki Kimura, Kyoto (JP); Ryosuke Ogata, Kyoto (JP); Erika Abe, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 17/466,927

(22) Filed: Sep. 3, 2021

(65) Prior Publication Data

US 2022/0111293 A1 Apr. 14, 2022

(30) Foreign Application Priority Data

Oct. 9, 2020 (JP) .............................. JP2020-170975

(51) Int. Cl.
| | |
|---|---|
| *A63F 13/426* | (2014.01) |
| *A63F 13/803* | (2014.01) |
| *A63F 13/573* | (2014.01) |
| *A63F 13/5258* | (2014.01) |
| *A63F 13/2145* | (2014.01) |

(52) U.S. Cl.
CPC ........ *A63F 13/426* (2014.09); *A63F 13/5258* (2014.09); *A63F 13/573* (2014.09); *A63F 13/803* (2014.09); *A63F 13/2145* (2014.09); *A63F 2300/6045* (2013.01); *A63F 2300/646* (2013.01); *A63F 2300/6684* (2013.01); *A63F 2300/8017* (2013.01)

(58) Field of Classification Search
CPC .. A63F 13/426; A63F 13/5258; A63F 13/803; A63F 13/422
See application file for complete search history.

(56) References Cited

U.S. PATENT DOCUMENTS 5,106,098 A * 4/1992 Filiczkowski ...... A63F 3/00082
273/246

OTHER PUBLICATIONS

Sonic and Sega All-Star Racing video game published in 2010 by Sega as evidenced by YouTube Video "Sonic Sega All-Star Racing Review" published Feb. 23, 2010 (Year: 2010).*
Sonic All-Stars Racing Wiki Guide by IGN-Game Guides on Mar. 30, 2012 (Year: 2012).*
Online—URL:https://mariokarttour.com/en-US, "Mario Kart Tour", Nintendo of America Inc., Retrieved Sep. 2, 2021, 12 pages.

* cited by examiner

*Primary Examiner* — James S. McClellan
(74) *Attorney, Agent, or Firm* — Nixon & Vanderhye PC

(57) ABSTRACT

It is determined whether execution is to be carried out in a first mode or in a second mode, according to a user's selection operation. In the first mode, a movement of a player object is controlled according to the user's movement operation, and a movement of a non-player object is automatically controlled. Positions of the player object and the non-player object are changed according to the user's position changing operation such that a relative positional relationship between the player object and the non-player object for use in the second mode is a first positional relationship. In the second mode, movements of the player object and the non-player object are automatically controlled while maintaining the first positional relationship.

20 Claims, 13 Drawing Sheets

STORAGE MEDIUM STORING INFORMATION PROCESSING PROGRAM, INFORMATION PROCESSING APPARATUS, INFORMATION PROCESSING SYSTEM, AND INFORMATION PROCESSING METHOD

CROSS REFERENCE TO RELATED APPLICATION

This application claims priority to Japanese Patent Application No. 2020-170975, filed on Oct. 9, 2020, the entire contents of which are incorporated herein by reference.

FIELD

The technology disclosed herein relates to storage media storing an information processing program, information processing apparatuses, information processing systems, and information processing methods, and more specifically, to, for example, a storage medium storing an information processing program, information processing apparatus, information processing system, and information processing method that perform a game process of moving a player object according to a user's operation.

BACKGROUND AND SUMMARY

There have been conventionally game programs in which a racing game is performed using a virtual game stage. In such game programs, in order to play a game using a player object on the game stage, it is necessary for a user themselves to perform an operation of moving the player object.

However, since in the above game programs, the user's operation is required so as to move a player object on the game stage of a racing game, there is room for improvement in casual playing on the game stage.

Therefore, it is an object of this non-limiting example to provide a storage medium storing an information processing program, information processing apparatus, information processing system, and information processing method that allow a user to more casually play a game on a game stage.

To achieve the above, this non-limiting example has the following features, for example.

In a non-limiting example configuration of a non-transitory computer-readable storage medium having stored therein an information processing program of this non-limiting example, a non-transitory computer-readable storage medium having stored therein instructions that, when executed by a computer of an information processing apparatus that controls a racing game employing a virtual game stage, cause the computer to perform operations comprising: determining whether the racing game on the virtual game stage is to be executed in a first mode or in a second mode, according to a user's selection operation; controlling a movement of a player object on the virtual game stage according to the user's movement operation, and automatically controlling a movement of a non-player object on the virtual game stage, in the first mode; changing positions of the player object and the non-player object on the virtual game stage according to the user's position changing operation such that a relative positional relationship between the player object and the non-player object on the virtual game stage for use in the second mode is a first positional relationship; automatically controlling movements of the player object and the non-player object on the virtual game stage while maintaining the first positional relationship, in the second mode; and giving a reward to the user, based on a game event based on the position of the player object in a progression and/or result of the racing game on the virtual game stage in each of the first and second modes.

Thus, for the racing game employing one virtual game stage, the first mode in which the movement of the player object is controlled according to the user's operation, and the second mode in which the movement of the player object is automatically controlled, are prepared. Therefore, the game can be more casually played on one virtual game stage.

Further, the user's operation in the first mode may be is the movement operation, and a position and/or orientation of a virtual camera for generating the racing game image may be changed according to the user's operation in the second mode.

Thus, the plurality of modes in which the motion of the player object is controlled in different manners can also serve as modes having different operation systems. Therefore, various operation environments can be provided.

Further, in each of the first and second modes, the reward may be determined based on the place in which a race is finished as the result of the racing game on the virtual game stage as the game event.

Therefore, a reward can be obtained in accordance with the same criterion in both of the first and second modes.

Further, the relative positional relationship may be the first positional relationship, and the position of the player object may be changed to a leading position in a traveling direction in the first positional relationship, according to the user's operation.

Therefore, a scene in which the user's favorite object is traveling in a leading position can be enjoyed.

Further, in the first mode, the reward may be determined based on the place in which a race is finished as the result of the racing game on the virtual game stage as the game event, and in the second mode, the reward may be determined irrespective of the place in which a race is finished.

Therefore, imbalance in reward between the different modes can be reduced.

Further, the progression and/or result of the racing game on the game stage may be evaluated using the same criterion in both of the first and second modes, and the reward may be given according to a result of the evaluation.

Thus, a reward similar to that in the first mode can be obtained in the second mode. Therefore, the user is more motivated to select the second mode.

Further, the relative positional relationship between the player object and the non-player object may be set to one selected from a plurality of preset patterns, according to the position changing operation.

Thus, in the second mode, the player object can be caused to travel not only in a fully automatic manner but also in a positional relationship having the user's favorite arrangement pattern. Therefore, the user is more motivated to select the second mode.

Further, the position of the player object in the selected pattern may be changed according to the user's operation.

Thus, not only the arrangement pattern of the positional relationship but also the position of the player object in the arrangement pattern can be changed according to the user's operation. Therefore, the user is more motivated to select the second mode.

Further, one of the player object and the non-player object in the selected pattern that is located at a position related to a gaze point of a virtual camera may be set, and the position of the set object in the pattern may be changed, according to the user's operation.

Therefore, the user's favorite image can be displayed.

Further, the position of a designated one of the player object and the non-player object in the selected pattern may be changed according to the user's operation such that the designated one is located at a leading position in the pattern in a traveling direction.

Therefore, a scene in which the user's favorite object is traveling in a leading position can be enjoyed.

Further, when the relative positional relationship between the player object and the non-player object is changed to another positional relationship having a different pattern, the position of each object may be changed stepwise in a period of time.

Thus, a motion in which formations are changed during traveling in a race can be represented in a realistic manner. Therefore, amusement inherent in a racing game can be represented.

Further, the instructions may cause the computer to perform further operations including: determining whether or not the virtual game stage has been cleared. In this case, as with game playing in the first mode, game playing in the second mode may be evaluated, and it may be determined whether or not the virtual game stage of the game playing has been cleared.

Thus, as in the first mode, the virtual game stage can be cleared in the second mode. Therefore, the user is more motivated to select the second mode.

Further, this non-limiting example may be carried out in the form of an information processing apparatus, information processing system, and information processing method.

In this non-limiting example, the first mode in which the movement of the player object is controlled according to the user's operation, and the second mode in which the movement of the player object is automatically controlled, are prepared. Therefore, the game can be more casually played.

These and other objects, features, aspects and advantages of the present exemplary embodiment will become more apparent from the following detailed description of the present exemplary embodiment when taken in conjunction with the accompanying drawings.

DETAILED DESCRIPTION OF NON-LIMITING EXAMPLE EMBODIMENTS

Figure 1:
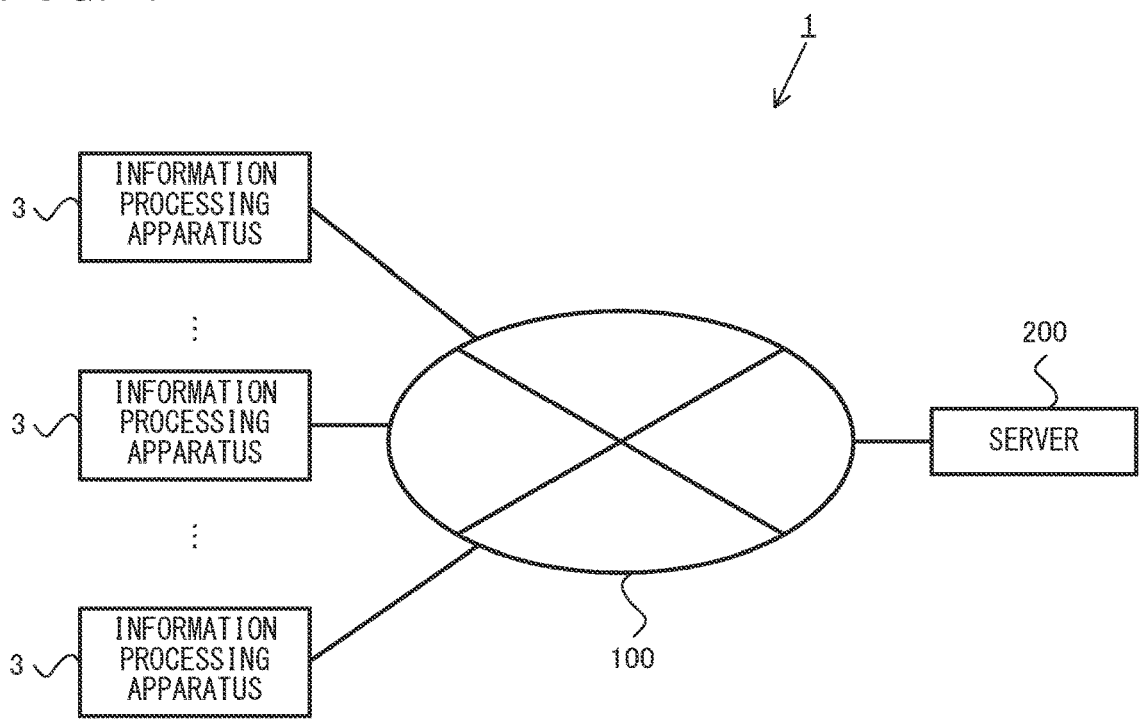
FIG. 1 is a diagram showing a non-limiting example of an information processing system 1 according to this non-limiting example.

An information processing system according to this non-limiting example will be described with reference to FIG. 1. As shown in FIG. 1, an information processing system 1 that is a non-limiting example of the information processing system of the non-limiting example, includes information processing apparatuses 3 and a server 200, which are connected together through a network 100. Although FIG. 1 shows a plurality of information processing apparatuses 3, the information processing system 1 may include only a single information processing apparatus 3.

The information processing apparatuses 3 are configured to be able to connect to the network 100 through wireless or wired communication. The information processing apparatuses 3 and the server 200 constitute a client-server system. For example, the information processing apparatuses 3 can execute a predetermined application (e.g., a game application, etc.). The information processing apparatuses 3 can connect to and communicate with the server 200 through the network 100 by executing the above predetermined application. For example, the information processing apparatuses 3 can execute an information processing program that is stored in a replaceable storage medium, such as a memory card or an optical disc, or is received from another apparatus. The information processing apparatuses 3 may be a typical personal computer, stationary game machine, mobile telephone, handheld game console, personal digital assistant (PDA), etc.

Figure 2:
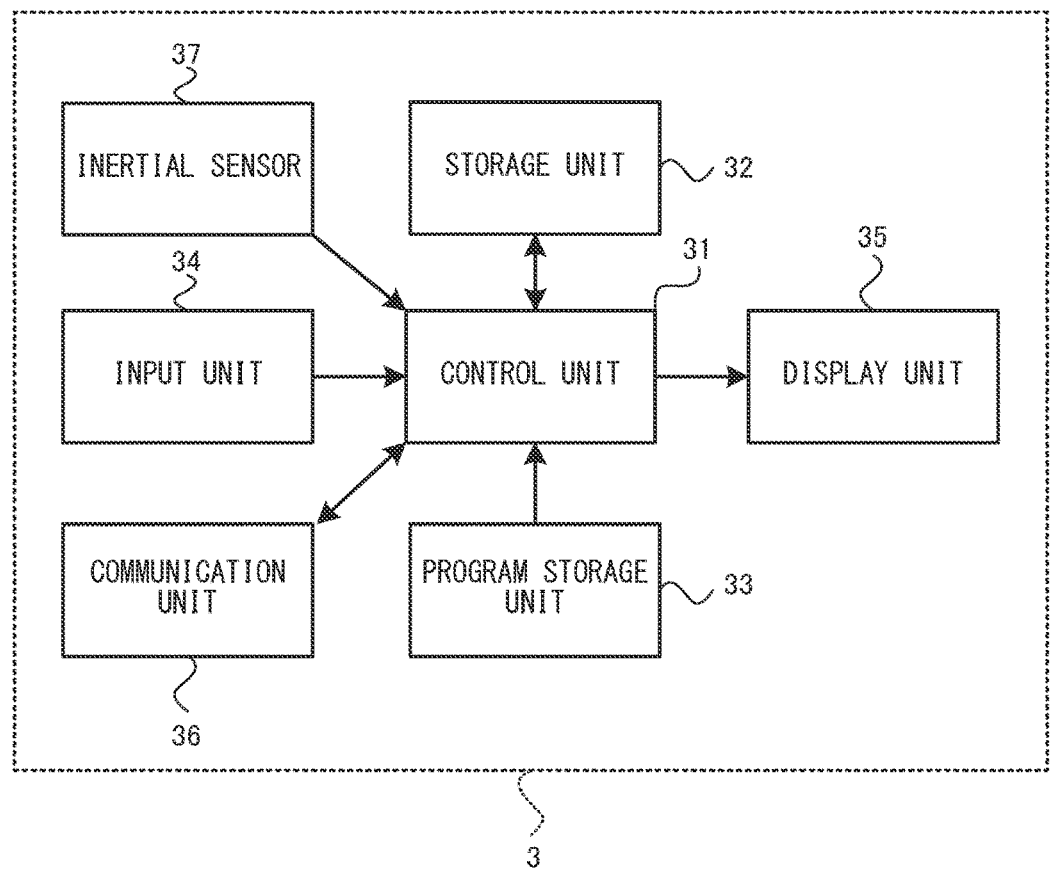
FIG. 2 is a block diagram showing a non-limiting example of a configuration of an information processing apparatus 3.

Next, the information processing apparatus 3 will be described with reference to FIG. 2. FIG. 2 is a block diagram illustrating a non-limiting example of a configuration of the information processing apparatus 3. In FIG. 2, the information processing apparatus 3 includes a control unit 31, a storage unit 32, a program storage unit 33, an input unit 34, a display unit 35, a communication unit 36, and an inertial sensor 37. It should be noted that the information processing apparatus 3 may include one or more devices including an information processing device including at least the control unit 31, and other devices.

The control unit 31 is an information processing means (computer) for executing various information processes, such as a CPU. For example, the control unit 31 has a function of executing the above application to perform information processes such as a game process described below, and data transmission and reception processes through the server 200. This function is performed by the control unit 31 (e.g., a CPU) executing predetermined programs.

The storage unit 32 stores various items of data that are used when the control unit 31 executes the above information processes. The storage unit 32 is, for example, a memory that can be accessed by the control unit 31 (e.g., a CPU).

The program storage unit 33 stores programs. The program storage unit 33 may be any storage device (storage medium) that can be accessed by the control unit 31. For example, the program storage unit 33 may be a storage device that is provided in the information processing device including the control unit 31, or a storage medium that is removably attached to the information processing device including the control unit 31. The program storage unit 33 may be a storage device (e.g., a server, etc.) that is connected to the control unit 31 through a network. The control unit 31 (CPU) may read all or a portion of a game program into the storage unit 32 and execute the read program with appropriate timing.

The input unit 34 is an input device that can be operated by a user. The input unit 34 may be any suitable input device. As a non-limiting example, the input unit 34 may be a touch panel provided on a screen of the display unit 35. For example, the touch panel may be of any type. The touch panel may be either of a type that allows a multi-touch input (e.g., a capacitive type) or of a type that allows a single-touch input (e.g., a resistive type).

The display unit 35 displays an image according to an instruction from the control unit 31. It should be noted that when the information processing apparatus 3 is a stationary game apparatus or a personal computer, the display unit 35 may be separated from the information processing apparatus 3. In this non-limiting example, the display unit 35 includes a touchscreen provided with a touch panel (the input unit 34) at a surface thereof, and a rectangular display region and touch region that have a first and a second side, the first side being longer than the second side.

The communication unit 36, which is a predetermined communication module, exchanges data with another apparatus (e.g., the server 200) or another information processing apparatus 3 through the network 100.

The inertial sensor 37, which detects an orientation and motion of the main body of the information processing apparatus 3, includes, for example, an acceleration sensor and/or an angular velocity sensor. For example, the acceleration sensor detects the magnitudes of accelerations along three orthogonal axial directions of the information processing apparatus 3 (the display unit 35). It should be noted that the acceleration sensor may detect an acceleration along one or two axial directions. The angular velocity sensor detects angular velocities about the three axes. It should be noted that the angular velocity sensor may detect an angular velocity about one or two axes. The inertial sensor 37 is connected to the control unit 31. A detection result of the acceleration sensor and/or angular velocity sensor is output to the control unit 31. Based on the detection result of the inertial sensor 37, the control unit 31 can calculate information about a motion and/or orientation of the information processing apparatus 3 (the display unit 35), e.g., an orientation of the information processing apparatus 3 (the display unit 35) in real space with respect to the direction of gravity.

Figure 3:
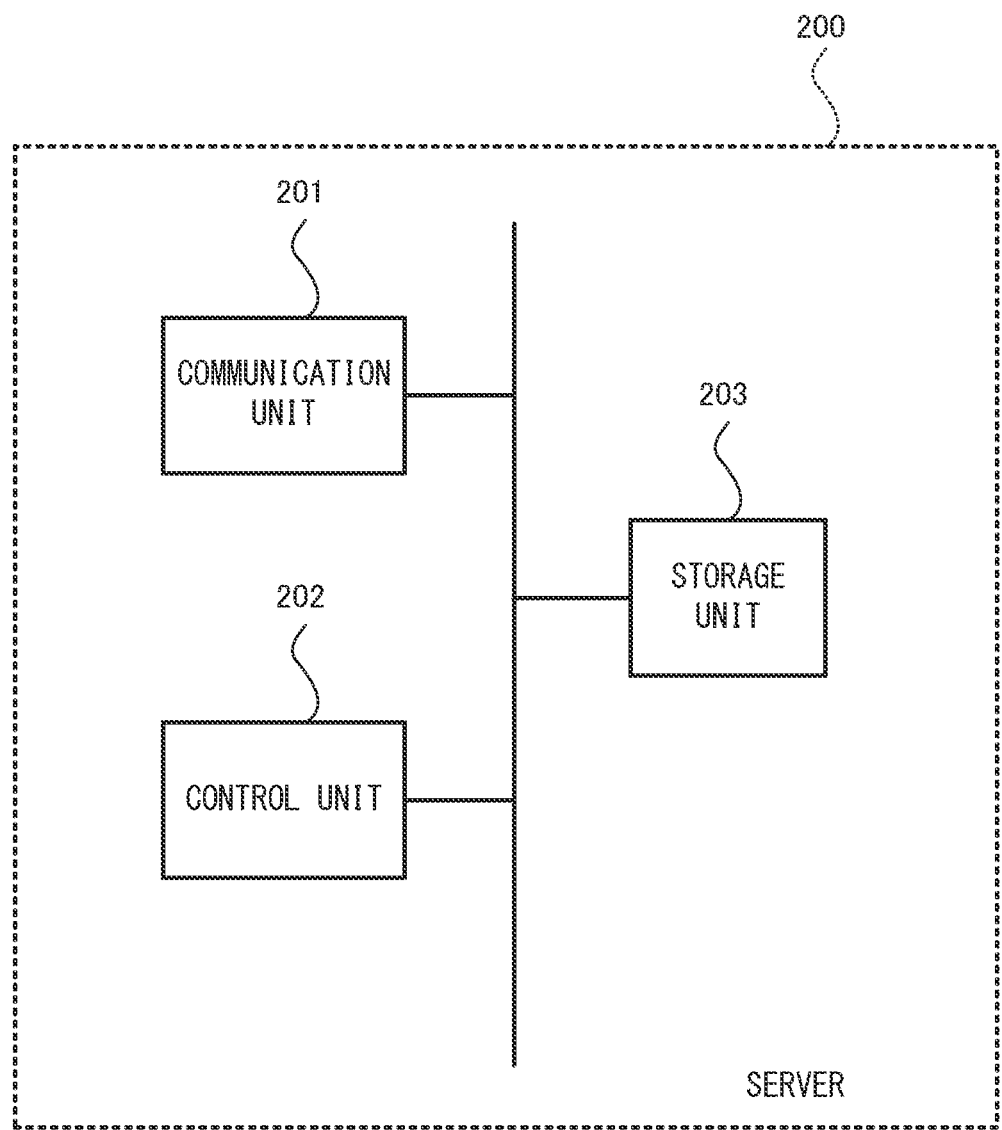
FIG. 3 is a block diagram showing a non-limiting example of a configuration of a server 200.

Next, the server 200 will be described with reference to FIG. 3. FIG. 3 is a block diagram illustrating a non-limiting example of a configuration of the server 200.

The server 200 has a communication unit 201, a control unit 202, and a storage unit 203. The communication unit 201 communicates with the information processing apparatuses 3, etc., through the network 100 by exchanging communication packets. As a non-limiting example, the control unit 202 performs a process of managing the progression of a game performed along with the information processing apparatus 3, a process of managing in-game currency (e.g., coins), game items, and game objects (e.g., pieces of equipment used in a game), etc., that are purchased by the user, a process of managing the probability of winning a slot lottery, and a process of managing information about payment or charging. The control unit 202 also establishes a communication link to the information processing apparatuses 3, etc., through the communication unit 201, and performs data transmission control and routing on the network 100. When a game is performed along with a plurality of information processing apparatuses 3, the control unit 202 manages a pairing or grouping of information processing apparatuses 3 that perform the game, and data communication between those information processing apparatuses 3. The storage unit 203 stores programs that are executed by the control unit 202, various items of data used for the above processes, various items of data used for communication with the information processing apparatuses 3, etc. When the system employs a predetermined log-in process for data exchange performed through the network 100, the server 200 may perform an authentication process to determine whether or not a user who tries to log in is an authorized user. The server 200 may be a single server machine or may include a plurality of server machines.

Figure 4:
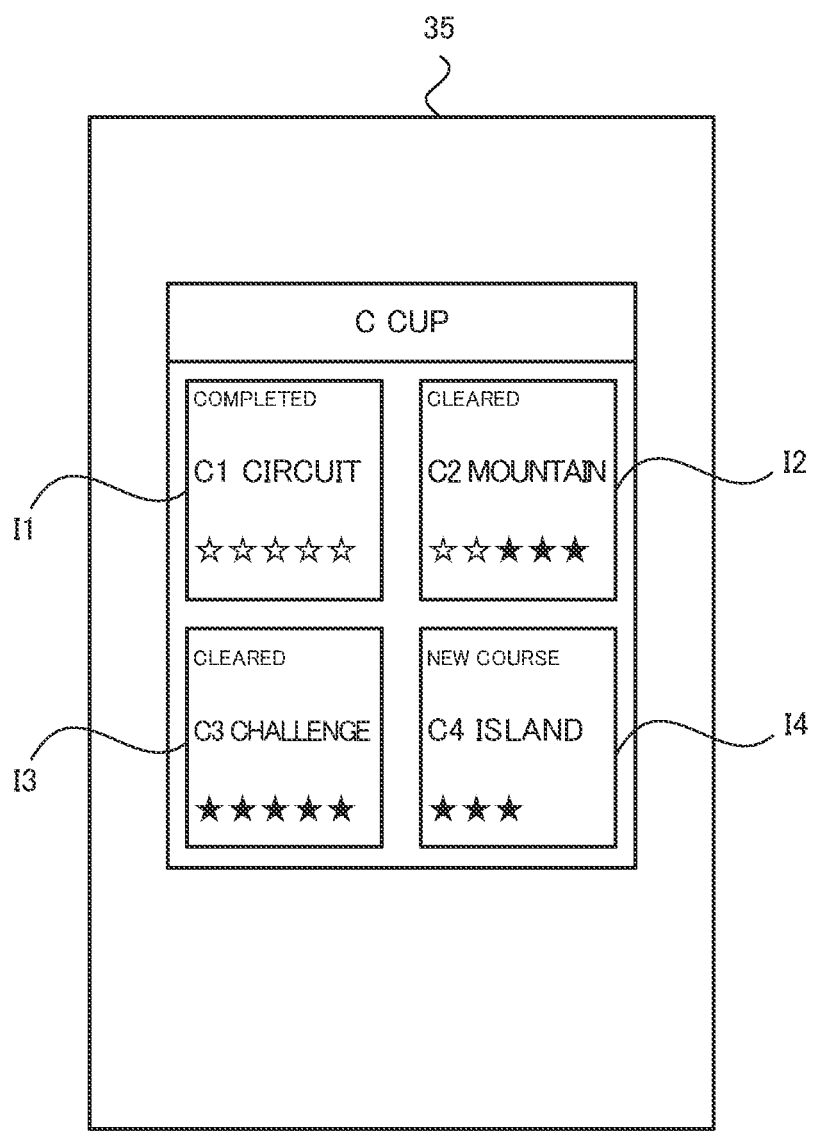
FIG. 4 is a diagram showing a non-limiting example of a game image showing a sub-event included in a tour event displayed on a display unit 35 of the information processing apparatus 3.
Figure 5:
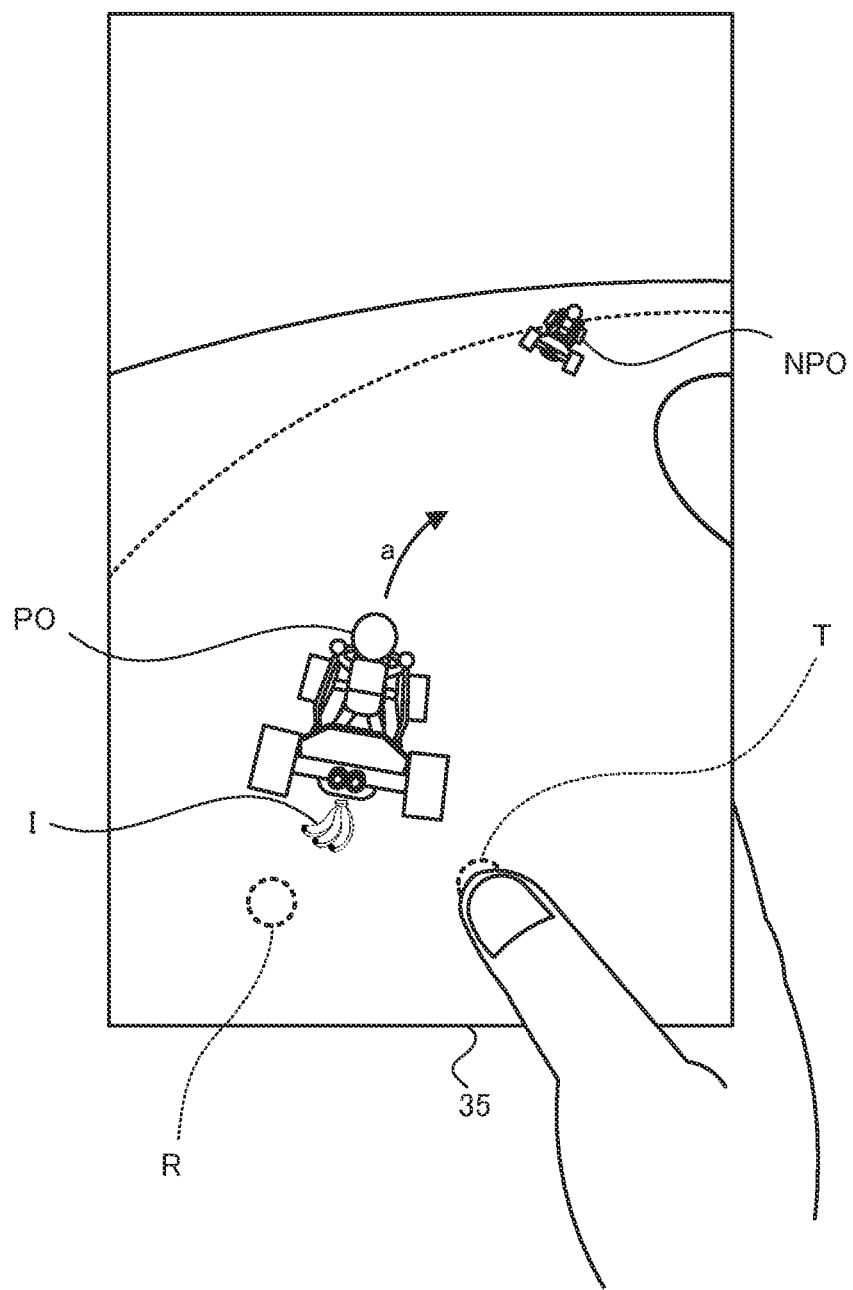
FIG. 5 is a diagram showing a non-limiting example of a game image displayed on the display unit 35 of the information processing apparatus 3 in a first mode.
Figure 6:
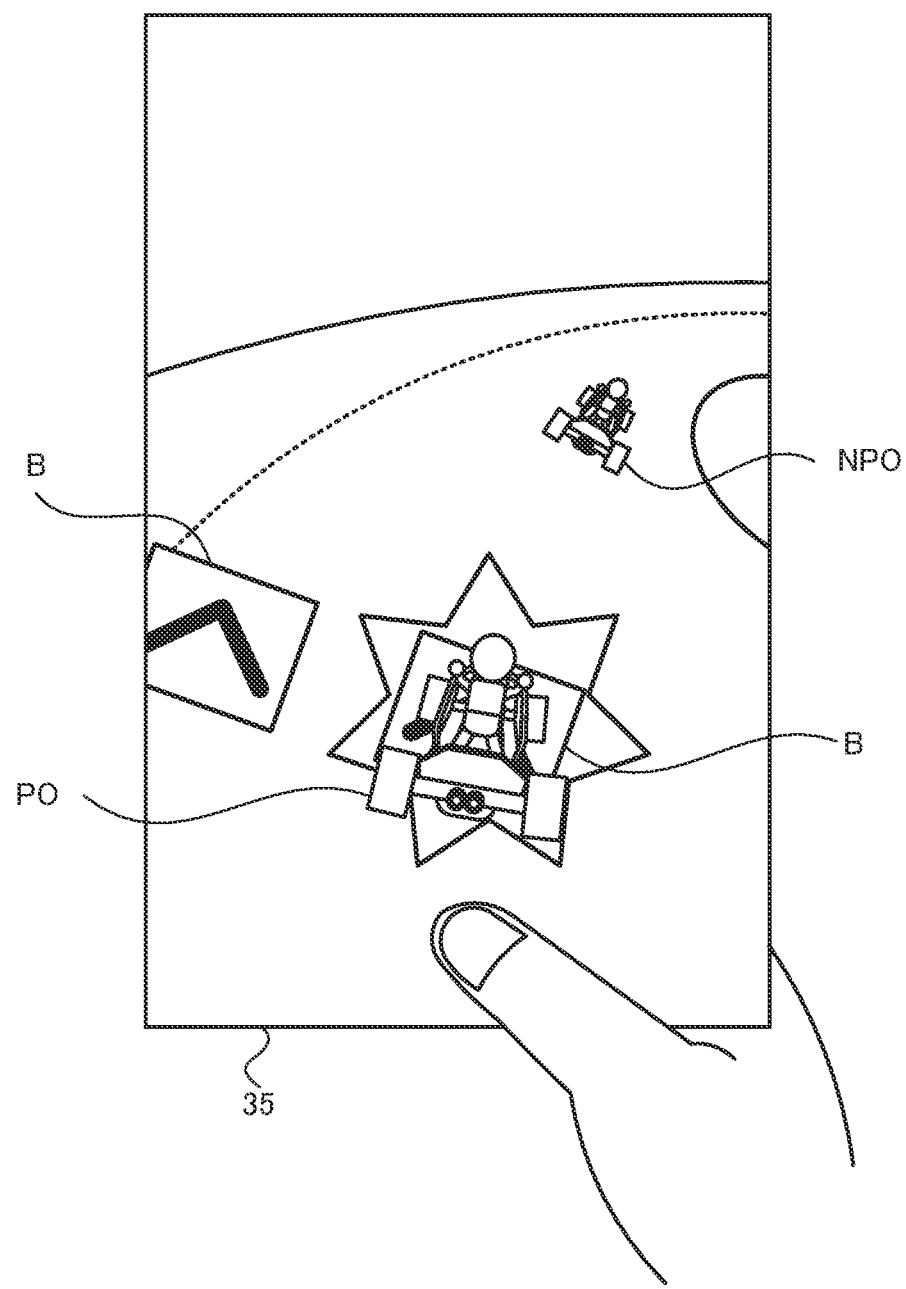
FIG. 6 is a diagram illustrating a non-limiting example of a game image in the case where points are added in the first mode.
Figure 7:
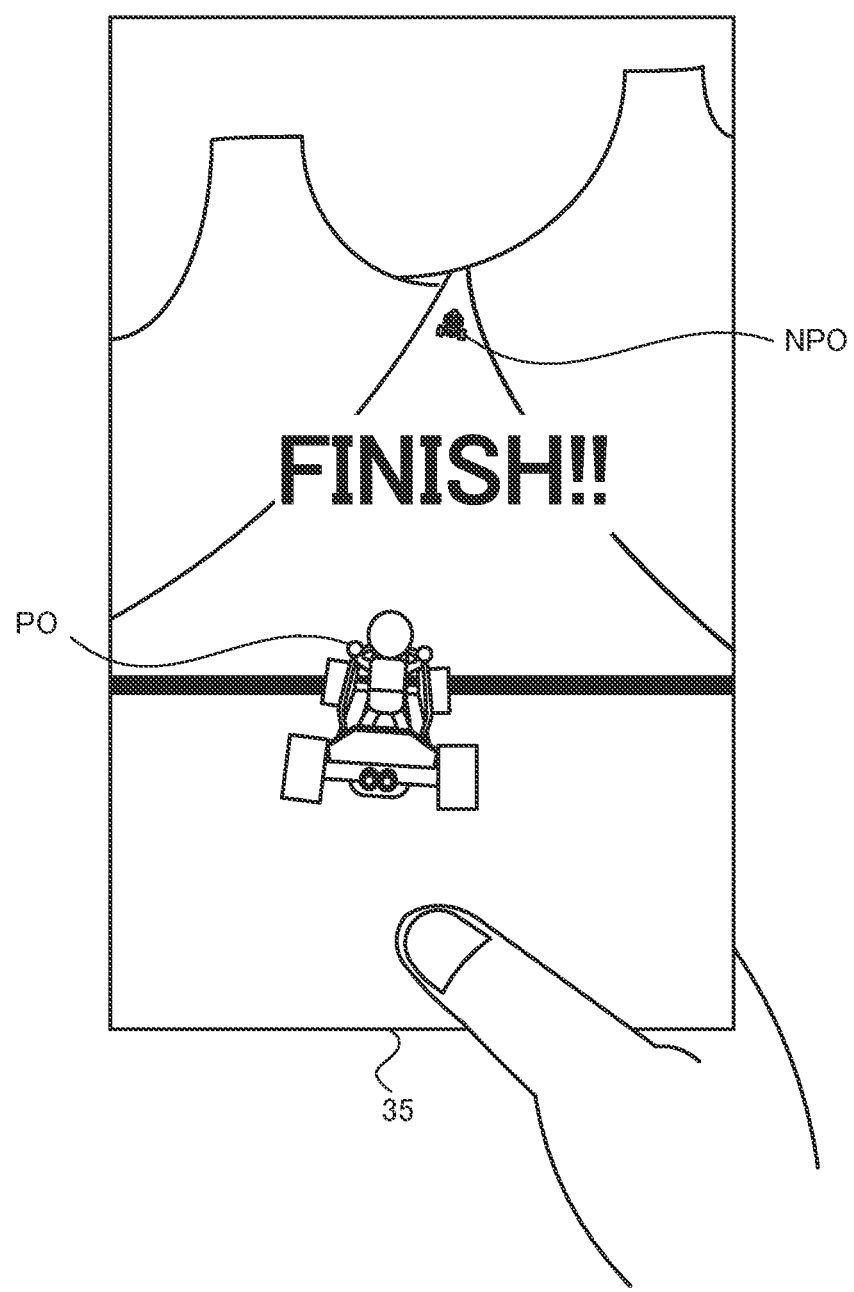
FIG. 7 is a diagram illustrating a non-limiting example of a game image in the case where a player character finishes a race in a racing game in the first mode.
Figure 8:
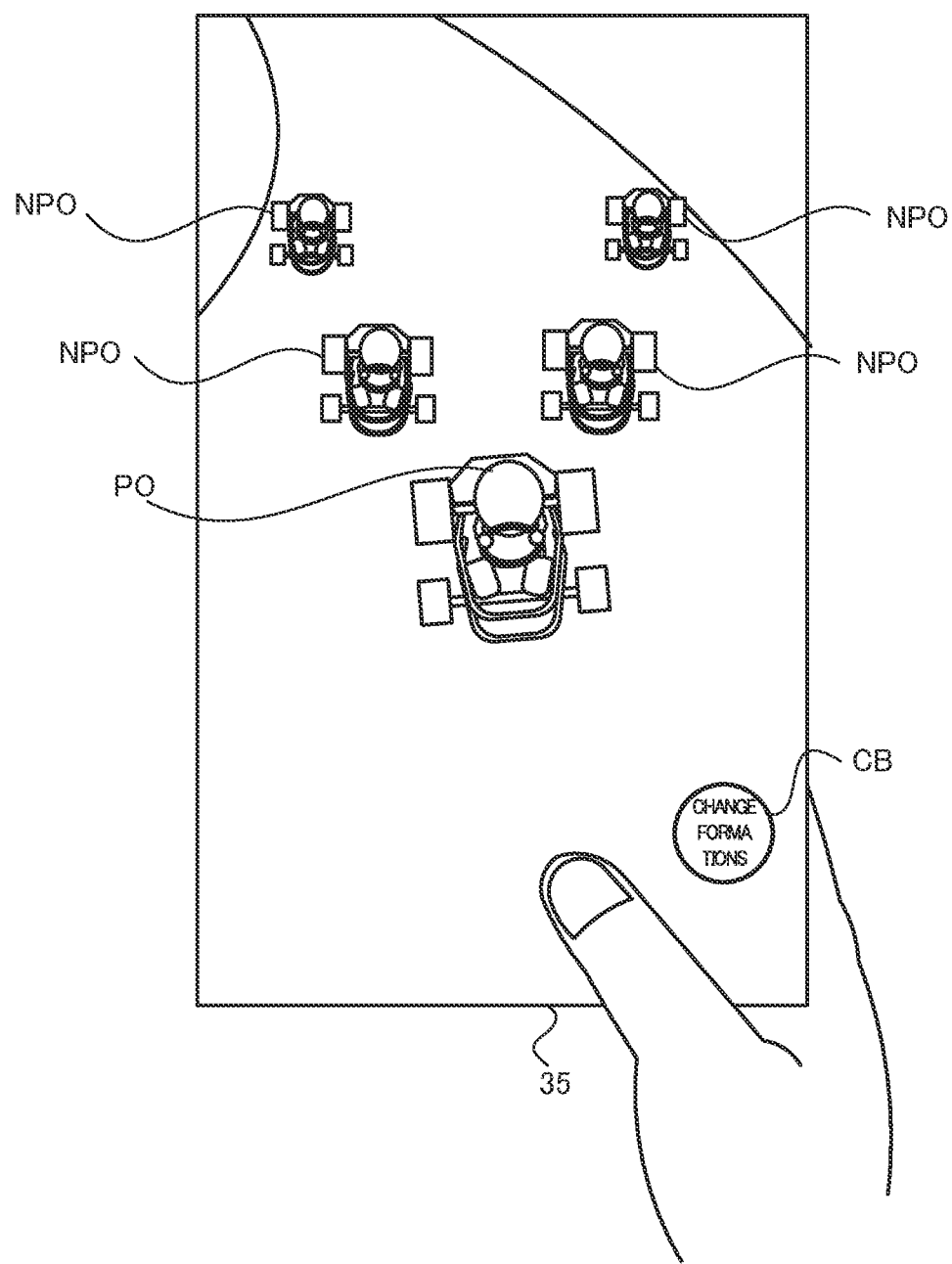
FIG. 8 is a diagram illustrating a non-limiting example of a game image displayed on the display unit 35 of the information processing apparatus 3 in a second mode.
Figure 9:
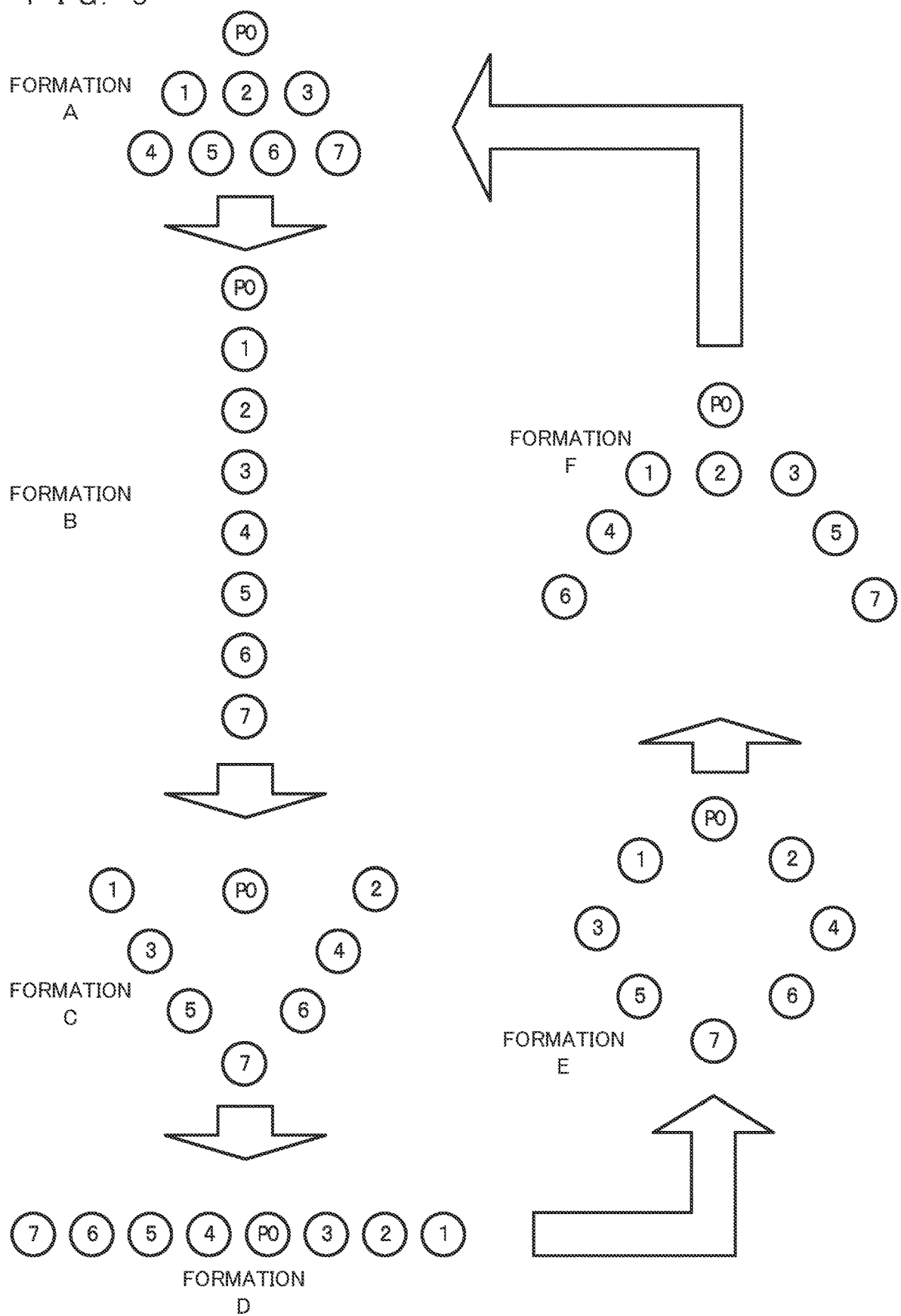
FIG. 9 is a diagram illustrating a non-limiting example of formations that are changed according to a user's operation.
Figure 10:
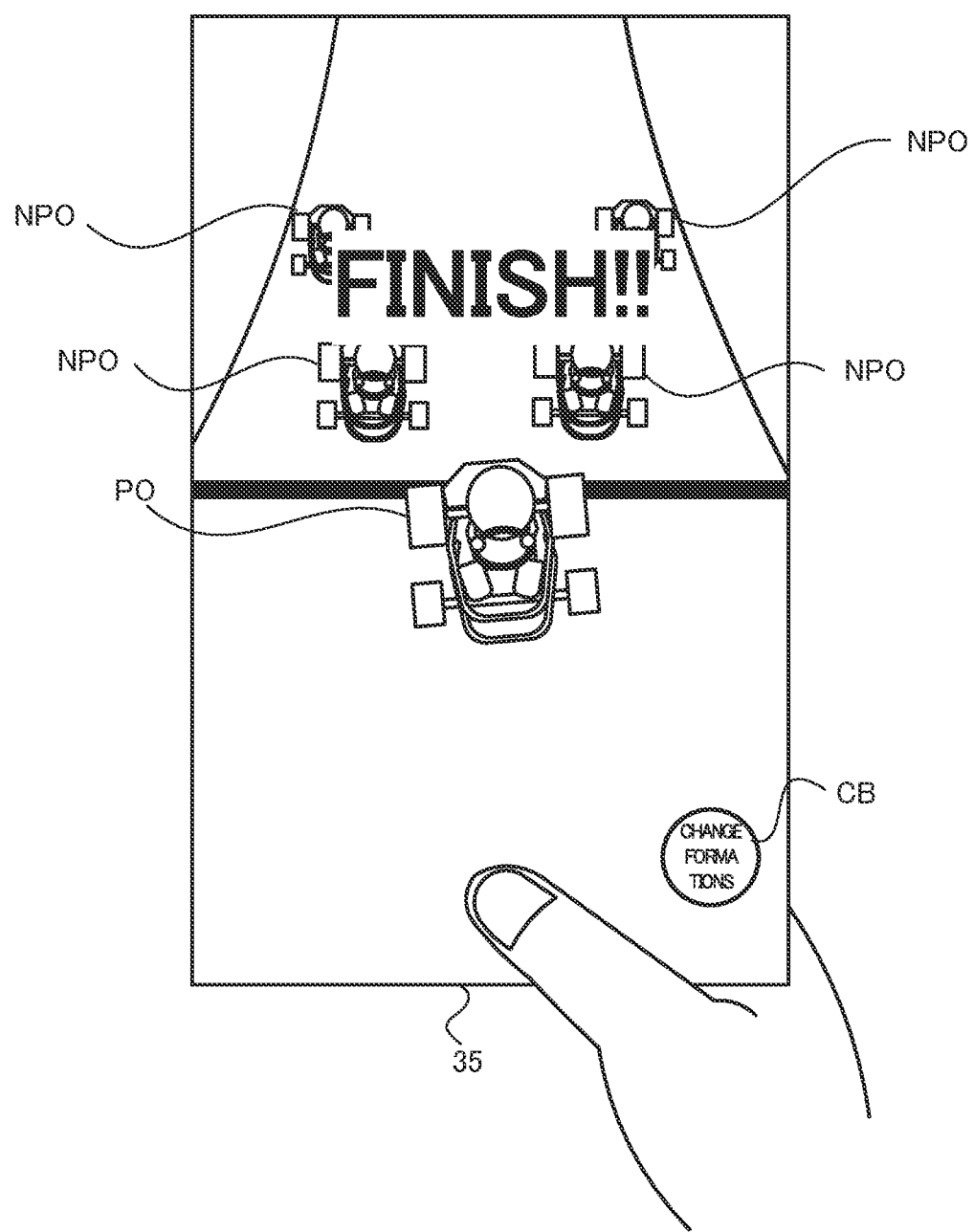
FIG. 10 is a diagram illustrating a non-limiting example of a game image in the case where a player character finishes a race in a racing game in the first mode.

Next, before describing specific processes performed by the information processing apparatus 3 and the server 200, a non-limiting example of a game process performed in the information processing system 1 will be outlined with reference to FIGS. 4-10. It should be noted that FIG. 4 is a diagram illustrating a non-limiting example of a game image showing a sub-event included in a tour event displayed on the display unit 35 of the information processing apparatus 3. FIG. 5 is a diagram illustrating a non-limiting example of a game image displayed on the display unit 35 of the information processing apparatus 3 in a first mode. FIG. 6 is a diagram illustrating a non-limiting example of a game image in the case where points are added in the first mode. FIG. 7 is a diagram illustrating a non-limiting example of a game image in the case where a player character finishes a race in a racing game in the first mode. FIG. 8 is a diagram illustrating a non-limiting example of a game image displayed on the display unit 35 of the information processing apparatus 3 in a second mode. FIG. 9 is a diagram illustrating a non-limiting example of formations that are changed according to a user's operation. FIG. 10 is a diagram illustrating a non-limiting example of a game image in the case where a player character finishes a race in a racing game in the first mode. In the description that follows, although a game is used as a non-limiting example of an application executed in the information processing apparatus 3, other applications may be executed in the information processing apparatus 3.

In a game process of this non-limiting example, a racing game including a plurality of tour events can be executed. For each tour event, a required cumulative value is set which indicates acquired points (star points) at which playing/execution of the tour event is permitted, and if the acquired points possessed by a user have reached the required cumulative value, playing/execution of the tour event is permitted. Each tour event includes a plurality of sub-events. Points (star points) can be acquired according to a result of execution of a racing game in which a course set for a sub-event is employed (points are acquired according to the progression or result of a racing game). It should be noted that a course set in each sub-event corresponds to a non-limiting example of a virtual game stage.

For example, as shown in FIG. 4, concerning the acquired points at which playing/execution of each tour event is permitted, the maximum number of points that can be acquired in each sub-event included in the tour event is set, a user can acquire points in a cumulative manner by repeatedly executing sub-events until the maximum number of points that can be acquired is reached. For example, the game image of FIG. 4 illustrates details of a C cup event that is a non-limiting example of a tour event. Specifically, it is illustrated that the C cup event includes four sub-events that are a C1 circuit I1, a C2 mountain I2, a C3 challenge I3, and a C4 island I4. It is also illustrated that for the C1 circuit I1, all possible points (the maximum number of points that can be acquired is five) have already been acquired by the user, and this state is a complete state. It is also illustrated that for the C2 mountain I2, two of all possible points (the maximum number of points that can be acquired is five) have already been acquired by the user, and three of them have not yet been acquired, and this state is a clear state. It is also illustrated that for the C3 challenge I3, no possible points (the maximum number of points that can be acquired is five) have yet been acquired, and this state is a clear state. It is also illustrated that for the C4 island I4, no possible points have yet been acquired (the maximum number of points that can be acquired is three), and the C4 island I4 is a new course (new event) that has not yet been cleared by the user. When the user acquires points by playing a sub-event for which the maximum number of points that can be acquired has not been reached, of the sub-events that can be played, these acquired points can be added to the points that have been acquired so far, i.e., points can be acquired in a cumulative manner. If the cumulative value of points acquired by the user has reached a required cumulative value for a tour event, the user is notified that playing/execution of that tour event is permitted.

In this non-limiting example, there are a first and a second mode in which a motion of each object appearing in a racing game is controlled in different manners. The first or second mode is selected or decided according to the user's operation. Specifically, in the first mode, a racing game is executed with a movement of a player object PO being controlled according to the user's movement operation, and a movement of a non-player object NPO being automatically controlled. In the second mode, a racing game is executed with movements of the player object PO and the non-player object NPO being automatically controlled while a positional relationship between the player object PO and the non-player object NPO is maintained. In the description with reference to FIGS. 5-7, a non-limiting example of a game process will be outlined using a non-limiting example of motion control in the first mode.

The display unit 35 of the information processing apparatus 3 displays a game image related to a game (e.g., a racing game using a course of a sub-event selected by the user) played on the information processing apparatus 3. FIG. 5 illustrates, as a non-limiting example of such a game image, a scene of a racing game in which a motion of the player object PO is controlled in the first mode. For example, in the game, the player object PO sits on a kart and drives the kart on a course provided in a virtual space. On the course, the non-player object NPO (opponent object) sits on and drives another kart. These objects compete to be first to reach a finish provided on the course. A virtual camera for generating a game image is disposed behind the player object PO as it is traveling on the course. It should be noted that when the player object PO turns and faces in a direction different from the travel direction of the course due to spinning, drifting, etc., the virtual camera may continue to be disposed at a position where the player object PO is viewed from behind the player object PO (i.e., the virtual camera is aimed toward the back of the player object PO), or may be disposed at a position where the player object PO is viewed from a backward position along the travel direction of the course (i.e., the virtual camera is aimed in the travel direction of the course).

As shown in FIG. 5, a movement direction of the player object PO can be controlled by performing an operation of touching the touch panel (input unit 34) provided on the screen of the display unit 35. As a non-limiting example, the player object PO is controlled to automatically travel forward along the course, and a leftward/rightward movement direction of the player object PO is controlled by the user's operation (e.g., a steering operation). Specifically, when a touch operation of swiping rightward is performed with reference to the position (initial touch position) where the touch panel of the display unit 35 was first touched (touchdown of a contact), the movement direction of the player object PO is changed to a rightward direction. When a touch operation of swiping leftward is performed with reference to the initial touch position on the touch panel of the display unit 35, the movement direction of the player object PO is changed to a leftward direction. For example, FIG. 5 shows a reference position R indicating a set reference coordinate point (e.g., the initial touch position on the touch panel), and a touch position T indicating a current touch position (actually, images indicating the reference position and the current touch position are not displayed on the display unit 35, while the reference position R indicating the reference position and the touch position T indicating the touch position are each indicated by a dashed line for the sake of convenience in FIG. 5). Because the touch position T is located to the right of the reference position R, the movement direction of the player object PO is changed to a rightward direction (direction "a" in FIG. 5). It should be noted that the player object PO may not be controlled to automatically travel forward along the course, and may be caused to travel according to the user's acceleration operation. The player object PO may also be controlled to be automatically steered to the left or right along the course. For example, when the course curves to the right, the movement direction of the player object PO may be changed to a rightward direction to some extent even without the user's steering operation, and in this case, when the user performs a rightward steering operation, the movement direction of the player object PO may be changed to a rightward direction to a further extent.

A motion of the player object PO firing a possessed item I can be controlled by performing a touch operation on the touch panel of the display unit 35. For example, an item I that can be fired by the player object PO is displayed at a ready-to-use position provided behind of the kart of the player object PO. When a touch operation of swiping upward is performed on the touch panel of the display unit 35, then if the item I disposed at the ready-to-use position of the player object PO is fireable, the item I is fired toward the front of the player object PO. It should be noted that some types of items I (e.g., a banana item) disposed at the ready-to-use position may be fired toward the back of the player object PO when a touch operation of swiping downward is performed on the touch panel of the display unit 35. It should be noted that if the direction in which the item I disposed at the ready-to-use position of the player object PO is fired is fixed, the item I may be fired in the fixed firing direction no matter whether a touch operation of swiping upward or downward is performed on the touch panel of the display unit 35. Some types of items I disposed at the ready-to-use position may not be fired from the player object PO and may be used by the player object PO itself. In that case, when a touch operation of swiping upward or downward is performed on the touch panel of the display unit 35, such an item I disposed at the ready-to-use position of the player object PO is used by the player object PO.

When the player object PO fires the item I, an effect that is advantageous to the progression of a race performed by the player object PO can be obtained according to the type of the item I. For example, when the item I indicating a carapace collides with the non-player object NPO, the collision may decelerate or stop, i.e., obstruct, the traveling of the non-player object NPO, and may cause damage to the non-player object NPO, depending on the extent of the collision. When the item I indicating a bunch of bananas collides with the non-player object NPO, the item I may affect the non-player object NPO such that the non-player object NPO slips on a road, so that the traveling of the non-player object NPO is decelerated or stopped.

Alternatively, the use of the item I may temporarily increase the ability of the player object PO itself for a predetermined period of time. For example, when the item I indicating a mushroom is used, the speed of the player object PO is increased for a predetermined period of time. It should be noted that the use of the item I may provide the effect of increasing the size of the player object PO itself for a predetermined period of time or the effect of increasing in-game coins possessed by the player object PO.

Depending on a motion, effect, number of times, etc., of the use of the item I by the player object PO, the user operating the player object PO can acquire points according to the progression or result of a racing game, and points that are acquired according to said points and with which playing/execution of each tour event is permitted. Another non-limiting example in which the user can acquire these kinds of points is a game event based on a position of the player object PO in the progression of a racing game. As a non-limiting example, as shown in FIG. 6, when the event that the player object PO passes over a dash panel B provided on a course in the virtual space occurs in the progression of a racing game, the user operating the player object PO acquires points corresponding to the passage. As another non-limiting example, the user operating the player object PO can acquire points according to the place or travel state (e.g., flying, jumping, traveling underwater, drifting, traveling history, etc.) of the player object PO during a race. Points acquired according to the progression or result of a racing game, and points that are acquired according to said points and with which playing/execution of each tour event is permitted correspond to a non-limiting example of a reward given to the user.

It should be noted that in the first mode, a motion (e.g., a movement, etc.) of the non-player object NPO including an opponent object is automatically controlled. In the first mode, even when the non-player object NPO uses an item I, or a game event (e.g., the passage of the non-player object NPO over a dash panel B) occurs based on the position of the non-player object NPO in the progression of a racing game, the user cannot acquire the above points.

Another non-limiting example in which the user acquires the above points in the first mode is a game event based on the position of the player object PO as a result of a racing game. For example, as shown in FIG. 7, the user operating the player object PO can acquire the above points based on the place in which the player object PO finishes a race as a result of a racing game. As a non-limiting example, in the above racing game, the player object PO finishes a race by traveling a predetermined number of laps (e.g., two laps) on a course in a sub-event in the first mode. The higher the place in which the player object PO finishes a race, the greater the number of points acquired by the player object PO. In the first mode, when the player object PO has finished a race, the sub-event for which the course on which the player object PO has finished the race is set is considered to be cleared by the user irrespective of the place in which the player object PO has finished the race.

Next, a non-limiting example of a game process will be outlined using a non-limiting example of motion control in the second mode with reference to FIGS. 8-10.

FIG. 8 illustrates a scene in which a racing game is performed by controlling a motion of the player object PO in the second mode. As described above, in the second mode, the player object PO and non-player objects NPO are arranged in a predetermined formation on a course provided in the virtual space, and are automatically controlled to travel. As a non-limiting example, as in the first mode, the player object PO finishes a race in a racing game by traveling a predetermined number of laps (e.g., two laps) on a course in a sub-event in the second mode. For example, in the non-limiting example of FIG. 8, the single player object PO and four non-player objects NPO are automatically controlled to travel along a course while maintaining an inverted V-formation with the player object PO leading the formation. In the second mode, a virtual camera for generating a game image is disposed in front of an object leading the formation (the player object PO in the non-limiting example of FIG. 8) along the course, with the gaze point of the virtual camera positioned on the leading object. It should be noted that when the player object P turns and faces in a direction different from the travel direction of the course due to spinning, drifting, etc., the virtual camera may continue to be disposed at a position where the player object PO is viewed from the front of the player object PO (i.e., the virtual camera is aimed toward the front of the player object PO), or may be disposed at a position where the player object PO is viewed from a forward position along the travel direction of the course (i.e., the virtual camera is aimed backward in the travel direction of the course).

The player object PO and non-player objects NPO can be arranged in a plurality of formations, which can be selected and changed according to the user's operation. As shown in FIG. 8, the display unit 35 displays, in a game image showing a racing game being performed in the second mode, a formation changing button CB for giving an instruction to change the above formations. Here, the formation changing button CB is an image showing a touch region for selecting a formation in which the player object PO and non-player objects NPO are to travel. When an operation of touching a circular region indicated by the formation changing button CB is performed, the formation is changed to the next formation to be selected, and the player object PO and non-player objects NPO continue to travel. It should be noted that the above plurality of formations previously prepared correspond to a non-limiting example of a plurality of predetermined patterns.

As shown in FIG. 9, a plurality of formations are set which can be selected and changed according to a touch operation on the formation changing button CB. FIG. 9 illustrates formations that can be formed by the single player object PO (indicated by PO in FIG. 9) and seven non-player objects NPO (indicated by 1-7 in FIG. 9), i.e., a total of eight objects. The objects travel upward in FIG. 9 in each formation.

For example, a formation A is a pyramidal formation with the player object PO leading the formation. The formation A is a default formation that is set when a game process is started in the second mode. A formation B is an end-to-end line formation with the player object PO leading the formation. The formation B is selected when a single touch operation is performed on the formation changing button CB during traveling in the formation A. A formation C is a V-formation with the player object PO leading the formation at the middle of the formation. The formation C is selected when a single touch operation is performed on the formation changing button CB during traveling in the formation B. A formation D is a side-by-side line formation with the player object PO positioned at the middle of the formation. The formation D is selected when a single touch operation is performed on the formation changing button CB during traveling in the formation C. A formation E is a circular formation with the player object PO leading the formation. The formation E is selected when a single touch operation is performed on the formation changing button CB during traveling in the formation D. A formation F is an inverted V-formation with the player object PO leading the formation. The formation F is selected when a single touch operation is performed on the formation changing button CB during traveling in the formation E. When a single touch operation is performed on the formation changing button CB during traveling in the formation F, the formation A is selected again.

When the formation is changed, so that a relative positional relationship between the objects forming the formation is changed, the positional relationship may be instantaneously changed, or may be changed stepwise (gradually) until the formation is rearranged into the next formation, in a predetermined period of time. In the latter case, motions of objects changing the formation while traveling in a race can be represented in a realistic manner, resulting in representation of amusement inherent in a racing game.

It should be noted that the above formations are a non-limiting example, and other formations may be set, and the above formations may be selected in other orders. The number of objects forming a formation may be at least nine or at most seven. Selectable travel forms may include a free travel form in which at least one object freely travels without being included in a formation. Although in the above non-limiting example, the player object PO leads the formations, a non-player object NPO may lead some formations, or the positions of objects may be changeable in some formations by the user's operation, or the object leading a formation may be changeable by the user's operation (e.g., an operation of changing an orientation/position of the virtual camera and other operations performed by the user as described below). Formations may be changed by the user's operation with any appropriate timing, if in the second mode, or immediately before transition to the second mode.

Even in the case where selectable travel forms include a travel form in which at least one object freely travels without being included in a formation, the free travel may be performed while the relative positional relationship or distances between the player object PO and the non-player objects NPO are maintained. For example, when an object at the top or bottom end of a formation is freely traveling at least a predetermined distance away from the other objects, the object at the top end traveling at least the predetermined distance away may be decelerated, or the object at the bottom end traveling at least the predetermined distance away may be accelerated, so as to reduce the distance between the freely traveling object at the top or bottom end and the other objects. This can reduce objects that are traveling outside the field of view of the virtual camera, and therefore, a game image can be generated which displays a freely traveling object and a relatively large number of other objects.

In the second mode, an orientation and/or position of the virtual camera can be controlled by performing a touch operation on the touch panel (input unit 34) provided on the screen of the display unit 35. As a non-limiting example, the orientation and/or position of the virtual camera can be changed such that the gaze point of the virtual camera is changed to the direction (swipe direction) of a touch operation of swiping upward, downward, leftward, or rightward on the touch panel of the display unit 35. Specifically, when a touch operation of swiping rightward is performed with reference to the position where the touch panel of the display unit 35 was first touched, the orientation and/or position of the virtual camera is changed such that the gaze point of the virtual camera is moved rightward. When a touch operation of swiping leftward is performed with reference to the position where the touch panel of the display unit 35 was first touched, the orientation and/or position of the virtual camera is changed such that the gaze point of the virtual camera is moved leftward. When a touch operation of swiping upward is performed with reference to the position where the touch panel of the display unit 35 was first touched, the orientation and/or position of the virtual camera is changed such that the gaze point of the virtual camera is moved upward. When a touch operation of swiping downward is performed with reference to the position where the touch panel of the display unit 35 was first touched, the orientation and/or position of the virtual camera is changed such that the gaze point of the virtual camera is moved downward.

The gaze point of the virtual camera may be set on the object disposed at the top end of a formation (the player object PO in the non-limiting example of FIG. 8). In this case, when the formation is changed to a new formation as described above, the gaze point of the virtual camera is moved from the object at the top end of the previous formation to the object at the top end of the new formation. When the user's operation of changing the orientation and/or position of the virtual camera is performed as described above such that the gaze point of the virtual camera is moved onto another object or in the vicinity thereof, the relative positional relationship between objects in a formation is changed such that said object is positioned at the top end of the formation. In other words, by the user's operation of changing the orientation and/or position of the virtual camera, the positions of objects in a formation can be changed, and an object can be designated to lead the formation.

It should be noted that when the gaze point of the virtual camera is changed to another object by the user's operation of changing the orientation and/or position of the virtual camera as described above, the relative positional relationship between objects in a formation may be changed such that said object is moved to a different position in the formation. For example, the above object may be moved to the bottom end of the formation, a center position of the formation (e.g., a position closest to the center-of-gravity position of the formation), or a reference position set for each formation.

In the second mode, the user can acquire points according to the progression or result of a racing game, and points according to said points, the latter points permitting playing/execution of each tour event. In the second mode, a non-limiting example of a game event in which the user can acquire these kinds of points is one that is based on the position of the player object PO in the progression of a racing game. As a non-limiting example, when the event that the player object PO as it is automatically traveling in a formation passes over a dash panel B provided on a course in the virtual space occurs during the progression of a racing game in the second mode, the user can acquire points corresponding to the passage. As another non-limiting example, the user can acquire the points according to the place or travel state (e.g., flying, jumping, traveling underwater, drifting, traveling history, etc.) in a race of the player object PO as it is automatically traveling in a formation.

It should be noted that in the second mode, motions (e.g., movements, etc.) of non-player objects NPO including an opponent object are also automatically controlled. In addition, in the second mode, even when a game event based on the position of a non-player object NPO occurs in the progression of a racing game (e.g., a non-player object NPO passes over a dash panel B), the user cannot acquire the above points.

Another non-limiting example of a game event in which the user can acquire the above points in the second mode is one that is based on the position of the player object PO as a result of a racing game result. For example, when the player object PO finishes a race in the second mode as shown in FIG. 10, the user can acquire the above points based on the finishing.

Here, the points acquired when the player object PO finishes a race in the second mode are determined irrespective of the place in which the player object finishes the race. In other words, in the second mode, the user acquires the same points no matter in what place the player object PO finishes a race (e.g., points corresponding to fourth place in which the player object PO finishes). Even if a racing game is executed in the second mode, then when the player object PO finishes a race, it is considered that the user clears a sub-event in which the course that the player object PO finishes is set, irrespective of the place in which the player object finishes the race. In this case, imbalance in points (reward) due to a difference between play in the first mode and play in the second mode can be reduced. It should be noted that as in the first mode, more points may be acquired as the place in which the player object PO finishes a race becomes higher in the second mode. In that case, points (reward) can be acquired based on the same criterion no matter whether the first or second mode is selected. Thus, in this non-limiting example, in any case, even when the player object PO finishes a racing game in the second mode, points similar to those that can be acquired in the first mode can be acquired, so that playing/execution of other sub-events and tour events can be permitted, and therefore, the user is more motivated to select playing in the second mode.

It should be noted that a formation used in the second mode may temporarily collapse during a racing game. As a first non-limiting example, at least one object included in a formation may temporarily leave the formation due to difficulty in traveling when the object collides with another object or deviates from the track during traveling. In that case, after the above difficulty in traveling is overcome, the object that has left may be automatically returned to its original position in the formation, i.e., the object that has left may be caused to perform a motion to finally return to and travel in the formation as it was before the object has left. As a second non-limiting example, in the case where a course used in a racing game has a branch track different from the main track on which other objects included in a formation travel, at least one object included in the formation may travel on the branch track. In that case, the object that has left the formation and is traveling on the branch track may be automatically returned to its original position in the formation, after temporarily traveling on the branch track, when the branch track merges with the main track, i.e., the object that has left may be caused to perform a motion to finally return to and travel in the formation as it was before the object has left.

In the above non-limiting examples, the movement direction of the player object PO is controlled in the first mode, and the orientation and/or position of the virtual camera are controlled in the second mode, according to a touch operation of swiping. Alternatively, these controls may be performed according to other operations. As a non-limiting example, the movement direction of the player object PO may be controlled in the first mode, and the orientation and/or position of the virtual camera may be controlled in the second mode, according to an operation of changing an orientation of the entire information processing apparatus 3 (display unit 35). Such an operation of changing an orientation of the entire information processing apparatus 3 (display unit 35) can be detected by calculating the orientation of the entire information processing apparatus 3 (display unit 35) using the inertial sensor 37. As another non-limiting example, the movement direction of the player object PO may be controlled in the first mode, and the orientation and/or position of the virtual camera may be controlled in the second mode, according to an operation using another direction inputting means (e.g., a directional pad, ten-key, mouse, trackball, joystick, etc.) provided on the information processing apparatus 3.

The operation of changing the position of an object in a formation is not limited to the operation of changing the orientation and/or position of the virtual camera. As a non-limiting example, a selection marker may be moved according to a swipe operation, and an object indicated by the selection marker may be selected as one that leads a formation. Alternatively, an object that is being displayed at an initial touch position may be selected as one that leads a formation. Alternatively, objects in a formation are sequentially selected as one that leads the formation, i.e., a different object in the formation is selected as one that leads the formation each time the user enters an input (e.g., each time a button operation is performed or each time touchdown/liftoff of a contact is repeated).

In the second mode, other operations may be allowed in addition to the operation of changing formations and the operation of changing the object arrangement of a formation. As a non-limiting example, at least one object in a formation may perform a predetermined action according to the user's operation. As another non-limiting example, a process of capturing a still image of a game image being displayed in the second mode may be performed according to a predetermined operation performed by the user. In that case, the display unit 35 may temporarily display the above still image while pausing the progression of a racing game, or alternatively, the above still image may be stored in the storage unit 32. It should be noted that the above points may not be acquired by the above action or shooting.

Next, processes performed in the information processing apparatus 3 will be described in detail. Firstly, main data used in processes performed in the information processing apparatus 3 will be described with reference to FIG. 11. It should be noted that FIG. 11 is a diagram illustrating a non-limiting example of main data and programs stored in the storage unit 32 of the information processing apparatus 3.

Figure 11:
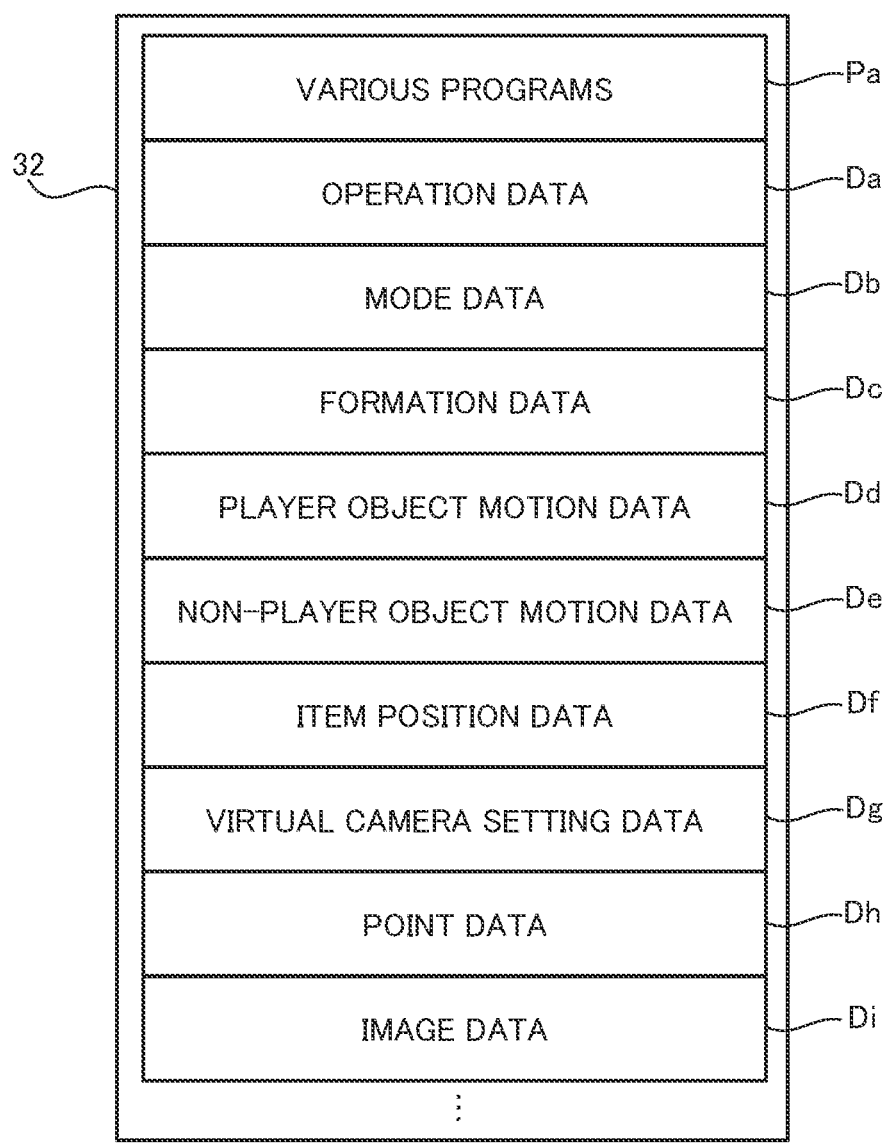
FIG. 11 is a diagram illustrating a non-limiting example of main data and programs stored in a storage unit 32 of the information processing apparatus 3.

As shown in FIG. 11, the storage unit 32 stores, in a data storage region, operation data Da, mode data Db, formation data Dc, player object motion data Dd, non-player object motion data De, item position data Df, virtual camera setting data Dg, point data Dh, image data Di, etc. It should be noted that the storage unit 32 stores, in addition to the data of FIG. 11, data required in processes such as data used in an executed application. The storage unit 32 also stores, in a program storage region, various programs Pa including an information processing program (game program), etc.

The operation data Da indicates operation information about the user's operation on the information processing apparatus 3. For example, operation data indicating an operation performed on the input unit 34 including the touch panel is acquired at time intervals that are the unit process time (e.g., 1/60 sec) of the information processing apparatus 3, and is stored in the operation data Da, i.e., the operation data Da is updated in response to the acquisition of that operation data. In addition, operation data detected by the inertial sensor 37 when the information processing apparatus 3 (display unit 35) is operated is acquired at time intervals which are the unit processing time of the information processing apparatus 3, and is stored in the operation data Da, i.e., the operation data Da is updated in response to the acquisition of that operation data. It should be noted that the operation data Da includes, in addition to data indicating the most recent input entered by the user's operation using the input unit 34, at least a history of the user's inputs until a predetermined period of time before (e.g., a history of touch positions where a touch operation was performed on the touch panel).

The mode data Db indicates an object motion control mode. Specifically, the mode data Db indicates whether the current motion control mode is the first or second mode.

The formation data Dc indicates a formation in which the player object PO and non-player objects NPO set in the second mode travel, and the arrangement of the objects at the leading position and the other positions in the formation.

The player object motion data Dd indicates the motion of the player object PO, and includes the position, speed, orientation, number of laps, place, etc., of the player object PO during a race. The non-player object motion data De indicates the motion of each non-player object NPO, and includes the position, speed, orientation, number of laps, place, etc., of each non-player object NPO during a race. The item position data Df indicates the type and position of an icon I disposed at or fired from the ready-to-use position.

The virtual camera setting data Dg indicates the position, orientation, angle of view, etc., of the virtual camera.

The point data Dh indicates the value of points acquired by the user in a racing game.

The image data Di is for displaying a game image (e.g., an image of the player object PO, images of non-player objects NPO, an image of an item I, an image of another virtual object, a field image of a course, a background image, etc.) on the display unit 35 of the information processing apparatus 3 in a game.

Figure 12:
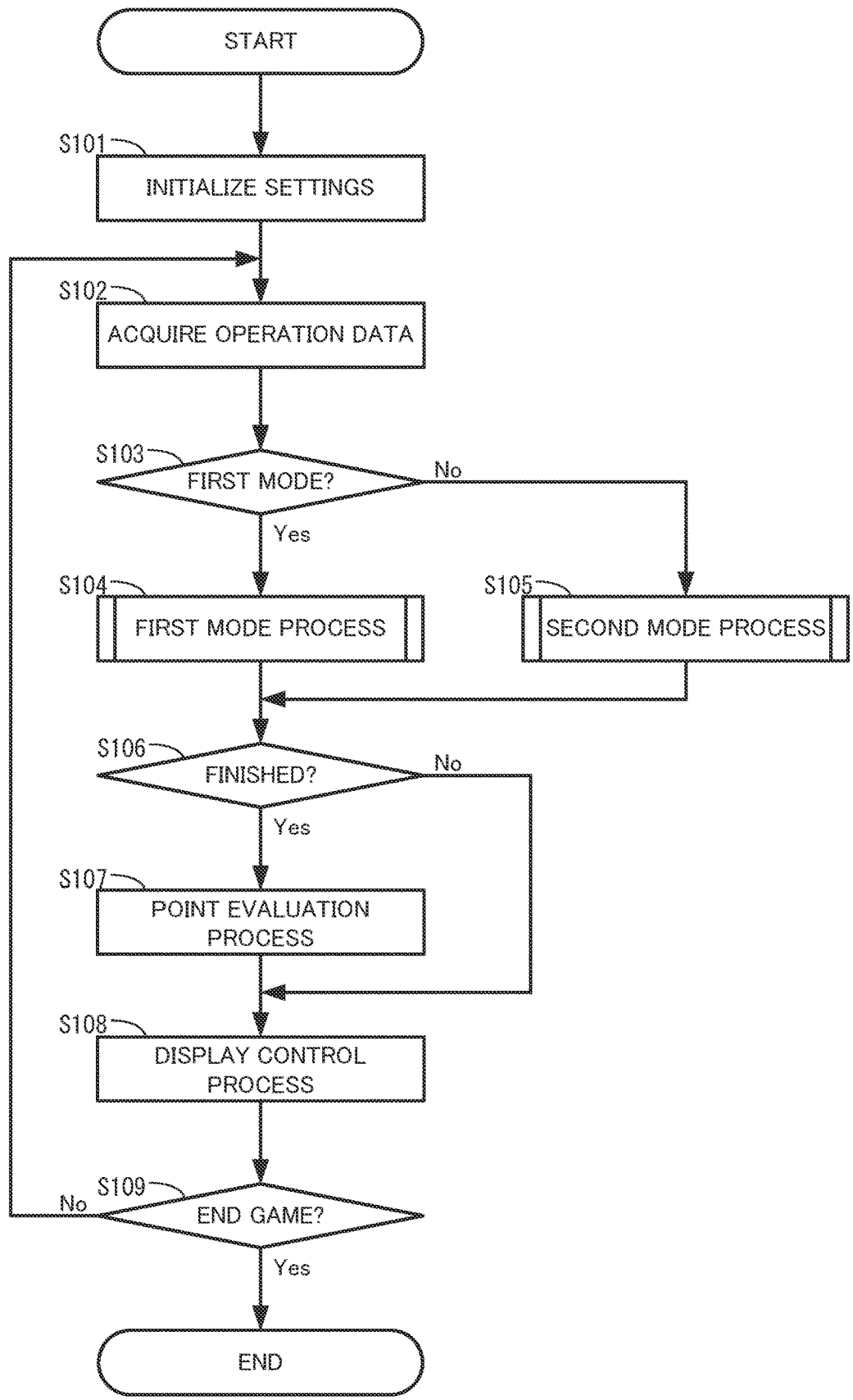
FIG. 12 is a flowchart illustrating a non-limiting example of a process executed in the information processing apparatus 3.
Figure 13:
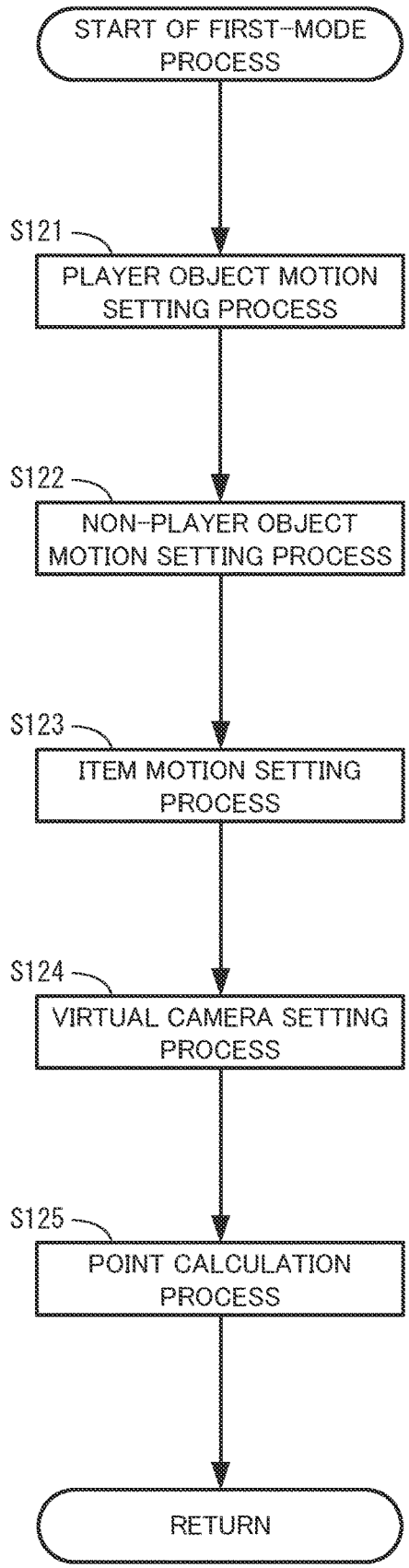
FIG. 13 is a subroutine illustrating a detailed non-limiting example of a first-mode process in step S104 of FIG. 12.
Figure 14:
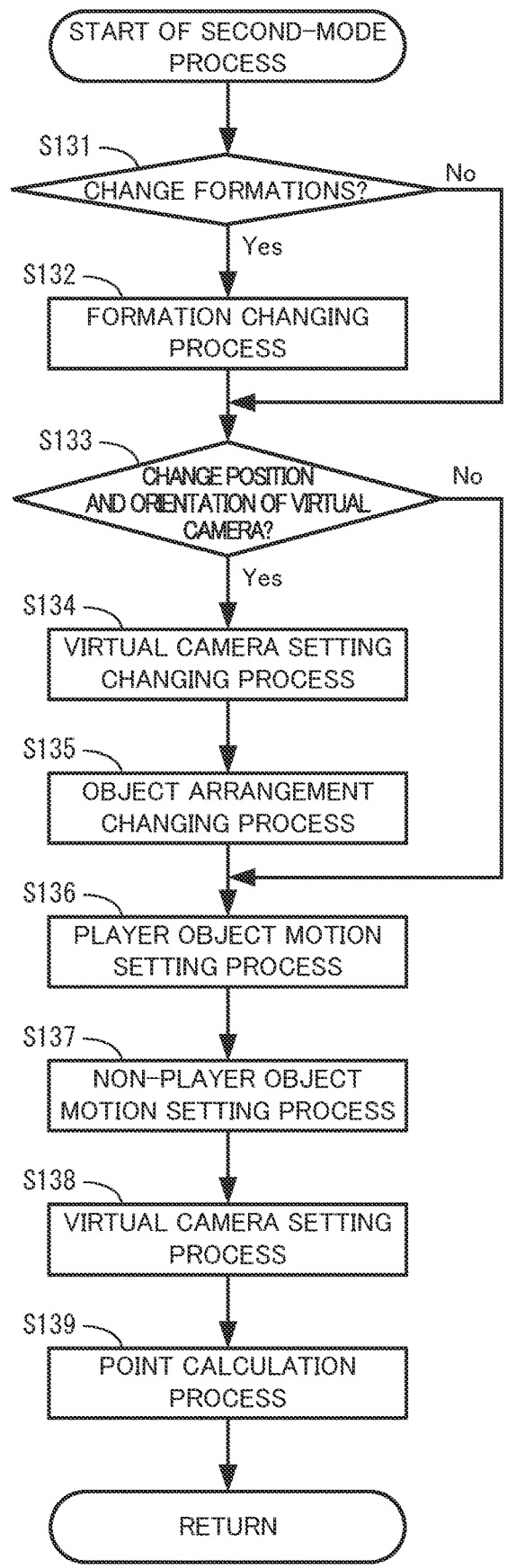
FIG. 14 is a subroutine showing a detailed non-limiting example of a second-mode process in step S105 of FIG. 12.

Next, processes performed in the information processing apparatus 3 will be described in detail with reference to FIGS. 12-14. It should be noted that FIG. 12 is a flowchart illustrating a non-limiting example of a process executed in the information processing apparatus 3. FIG. 13 is a subroutine illustrating a detailed non-limiting example of a first-mode process in step S104 of FIG. 12. FIG. 14 is a subroutine showing a detailed non-limiting example of a second-mode process in step S105 of FIG. 12. Here, in the flowcharts of FIGS. 12-14, game processes involved in the control of the player object PO, of the processes of the information processing system 1, will be mainly described as a non-limiting example, and the other processes that are not directly involved with these processes will not be described in detail. In FIGS. 12-14, each step executed by the control unit 31 is abbreviated to "S."

In this non-limiting example, processes shown in FIGS. 12-14 are performed by the control unit 31 (CPU) executing a game program, etc., stored in the program storage unit 33. It should be noted that the processes of FIGS. 12-14 are started with any appropriate timing. At this time, all or a portion of the game program is read from the storage unit 32 with appropriate timing, and is executed by the control unit 31. Thus, the processes of FIGS. 12-14 are started. It should be noted that the game program is assumed to be previously stored in the program storage unit 33. In another non-limiting example, the game program may be obtained from a storage medium removably attached to the information processing apparatus 3, and stored into the storage unit 32, or may be obtained from another apparatus through a network, such as the Internet, and stored into the storage unit 32.

The steps of the flowcharts of FIGS. 12-14 are merely illustrative. The order in which the steps are performed may be changed, and another step may be executed in addition to or instead of each step, if a similar result is obtained. Although in this non-limiting example, it is assumed that each step of the flowcharts is executed by the control unit 31, all or a portion of the steps of the flowcharts may be executed by another processor or a dedicated circuit instead of the CPU of the control unit 31.

In FIG. 12, the control unit 31 sets initial settings (step S101), and proceeds to the next step. For example, the control unit 31 initially sets parameters for use in the subsequent steps. For example, a formation in which the player object PO and non-player objects NPO travel in the second mode, and the arrangement of these objects, are initially set to a default formation (e.g., the formation A) and arrangement (e.g., the player object PO is located at the leading position), and the formation data Dc is updated. The control unit 31 also initially sets the motion control mode (the first or second mode) of the objects, and updates the mode data Db. As a non-limiting example, in the case where the motion control mode of the objects is initially set according to the user's operation, the control unit 31 initially sets the first or second mode based on the mode indicated by operation data acquired from the input unit 34, and updates the mode data Db. The mode setting may be allowed only during the time that settings for a racing game are initialized, or may be changed after the start of a racing game.

Next, the control unit 31 acquires operation data from the input unit 34 and the inertial sensor 37, and updates the most recent data of the operation data Da and the history of the operation data (step S102), and proceeds to the next step.

Next, the control unit 31 determines whether or not the motion control of a racing game is the first mode, by referring to the mode data Db (step S103). If the motion control is the first mode, the control unit 31 proceeds to step S104. Otherwise, i.e., if the motion control is the second mode, the control unit 31 proceeds to step S105.

In step S104, the control unit 31 performs a first-mode process, and proceeds to step S106. The first-mode process, which is performed in step S104, will be described with reference to FIG. 13 below.

In FIG. 13, the control unit 31 performs a process of setting a motion of the player object PO (step S121), and proceeds to the next step. For example, the control unit 31 sets the position and orientation of the player object PO, taking into consideration the calculated angle of the steering wheel, influences from the non-player objects NPO, etc., and determines the motion, position, orientation, etc., of the player object PO, taking into consideration the state of the player object PO set in the player object motion data Dd, and updates the player object motion data Dd. As a non-limiting example, when the player object PO is normally traveling on a course, the position of the player object PO is set, by calculation, to the position that is located a distance depending on the movement speed ahead in the direction on the course that is indicated by the angle of the steering wheel. For example, the angle of the steering wheel is calculated based on the history of touch input positions to the touch panel which is indicated by the operation data Da. If the leftward/rightward-direction component of a swipe input to the touch panel indicates a rightward swipe input, the rightward angle of the steering wheel is calculated based on the absolute value of the leftward/rightward-direction component. If the leftward/rightward-direction component of a swipe input to the touch panel indicates a leftward swipe input, the leftward angle of the steering wheel is calculated based on the absolute value of the leftward/rightward-direction component. In addition, if the operation data Da indicates liftoff of a contact from the touch panel, the angle of the steering wheel is changed, by calculation, such that the steering wheel returns to a straight-ahead position at a predetermined rate. It should be noted that the movement speed of the player object PO may be changed according to the user's operation or a state of a game (behavior of the player object PO, conditions of road surface, influences from the non-player objects NPO, etc.), and the angle of the steering wheel may be changed, depending on the state of a game.

Next, the control unit 31 performs a process of setting motions of the non-player objects NPO (step S122), and proceeds to the next step. As a non-limiting example, the control unit 31 produces the motion of each non-player object NPO according to a predetermined algorithm, taking into consideration an influence from the player object PO, etc., and updates the non-player object motion data De based on the motions.

Next, the control unit 31 performs a process of setting a motion of an item I (step S123), and proceeds to the next step. For example, the control unit 31 performs a process of moving an item I fired from the player object PO in a calculated firing direction by a distance based on a movement speed, and updates the item position data Df based on the position and orientation after the movement of the item I. For example, the firing direction is calculated based on the history of touch input positions to the touch panel which is indicated by the operation data Da (e.g., the upward/downward-direction components of swipe inputs to the touch panel). Specifically, if the length of the input vector toward the current touch position is at least a predetermined length, and the direction indicated by the input vector is in a forward-direction determination region that is set in a predetermined region including the upward direction as the center thereof, a direct forward direction of the player object PO is set as the firing direction. Alternatively, if the length of the input vector toward the current touch position is at least a predetermined length, and the direction indicated by the input vector is in a backward-direction determination region that is set in a predetermined region including the downward direction as the center thereof, a direct backward direction of the player object PO is set as the firing direction. It should be noted that if the length of the input vector is not at least the predetermined length or the direction of the input vector is not in the forward-direction determination region or in the backward-direction determination region, the item I continues to be disposed at the ready-to-use position of the player object PO.

Next, the control unit 31 performs a process of setting a virtual camera (step S124), and proceeds to the next step. For example, the control unit 31 moves the position of a virtual camera for generating a display image based on the position of the player object PO, and updates the virtual camera setting data Dg based on the position and orientation after the movement of the virtual camera. For example, the control unit 31 sets the virtual camera behind the player object PO along a course so as to generate a display image including the player object PO, and updates the virtual camera setting data Dg. It should be noted that when the player object PO turns and faces in a direction different from the travel direction of the course due to spinning, drifting, etc., the virtual camera may continue to be disposed at a position where the player object PO is viewed from behind the player object PO (i.e., the virtual camera is aimed toward the back of the player object PO), or may be disposed at a position where the player object PO is viewed from a backward position along the travel direction of the course (i.e., the virtual camera is aimed in the travel direction of the course).

Next, the control unit 31 performs a process of calculating points (step S125), and ends the subroutine. For example, when the player object PO performs a motion for which points are to be added, the control unit 31 adds points set for the motion, and updates the point value indicated by the point data Dh. For example, the control unit 31 adds points according to the motion, effect, number of times, etc., of the use of the item I by the player object PO. The control unit 31 also adds points in response to the passage of the player object PO over a dash panel B provided on a course in the virtual space. The control unit 31 also adds points according to the current place or travel state (e.g., flying, jumping, traveling underwater, drifting, traveling history, etc.) of the player object PO during a race.

Meanwhile, in step S105, the control unit 31 performs a second-mode process, and proceeds to step S106. The second-mode process of step S105 will be described with reference to FIG. 14 below.

The control unit 31 determines whether or not an operation of changing formations has been performed, by referring to the operation data Da (step S131). For example, if the operation data Da indicates that an operation of touching the formation changing button CB (see FIG. 8) has been performed by the user, the result of the determination by the control unit 31 in step S131 is positive. If an operation of changing formations has been performed, the control unit 31 proceeds to step S132. Otherwise, i.e., if an operation of changing formations has not been performed, the control unit 31 proceeds to step S133.

In step S132, the control unit 31 performs a process of changing formations, and proceeds to step S133. For example, the control unit 31 changes the formation indicated by the formation data Dc to one that is set as the next formation (see FIG. 9), and updates the formation data Dc. It should be noted that in the newly set formation, the arrangement of objects arranged at the leading position and the other positions may be set to a default object arrangement (e.g., the player object PO is disposed at the leading position) or may be set, continuing the object arrangement set in the previous formation.

In step S133, the control unit 31 determines whether or not an operation of changing the position and/or orientation of the virtual camera has been performed. For example, if the operation data Da indicates that an operation of swiping on the touch panel has been performed, the result of the determination by the control unit 31 in step S133 is positive. If an operation of swiping on the touch panel has been performed, the control unit 31 proceeds to step S134. Otherwise, i.e., if an operation of swiping on the touch panel has not been performed, the control unit 31 proceeds to step S136.

In step S134, the control unit 31 performs a process of changing settings of the virtual camera, and proceeds to the next step. For example, the control unit 31 moves the gaze point of the virtual camera in the swipe direction according to a swipe operation of changing the position and/or orientation of the virtual camera, and updates the virtual camera setting data Dg with the gaze point, position, and orientation after the movement of the virtual camera.

Next, the control unit 31 performs a process of changing the object arrangement (step S135), and proceeds to step S136. For example, when the gaze point of the virtual camera is moved onto a different object in a formation due to the changing of settings of the virtual camera in step S134, the control unit 31 changes the object arrangement such that the object indicated by the gaze point leads the formation, and updates the formation data Dc.

In step S136, the control unit 31 performs a process of setting a motion of the player object PO, and proceeds to the next step. As a first non-limiting example, the control unit 31 moves the entire formation indicated by the formation data Dc on a course according to a predetermined algorithm, and determines the motion, position, orientation, etc., of the player object PO such that the player object PO moves to the object arrangement of the formation, and updates the player object motion data Dd. As a second non-limiting example, when the current formation is being changed to a new formation by the formation changing process of step S132, the control unit 31 determines the motion, position, orientation, etc., of the player object PO such that the player object PO is moved stepwise from the position of the player object PO in the current formation to the position of the player object PO in the next formation, in a predetermined period of time, and updates the player object motion data Dd. As a third non-limiting example, when the player object PO is being moved to a new arrangement by the object arrangement changing process of step S135, the control unit 31 determines the motion, position, orientation, etc., of the player object PO such that the player object PO is moved stepwise from the position before the arrangement changing of the player object PO to the position after the arrangement changing of the player object PO, in a predetermined period of time, and updates the player object motion data Dd. It should be noted that the movement speed and movement direction of the player object PO in the first to third examples may be changed, depending on a state of a game (behavior of the player object PO, conditions of road surface, influences from the non-player objects NPO, etc.).

Next, the control unit 31 performs a process of setting motions of the non-player objects NPO (step S137), and proceeds to the next step. As a first non-limiting example, the control unit 31 moves the entire formation indicated by the formation data Dc on a course according to a predetermined algorithm, and determines the motion, position, orientation, etc., of each non-player object NPO such that the non-player object NPO is moved to the object arrangement of the formation, and updates the non-player object motion data De. As a second non-limiting example, when the current formation is being changed to a new formation by the formation changing process of step S132, the control unit 31 determines the motion, position, orientation, etc., of each non-player object NPO such that the non-player object NPO is moved stepwise from the position of the non-player object NPO in the current formation to the position of the non-player object NPO in the next formation, in a predetermined period of time, and updates the non-player object motion data De. As a third non-limiting example, when the player object PO is being moved to a new arrangement by the object arrangement changing process of step S135, the control unit 31 determines the motion, position, orientation, etc., of each non-player object NPO such that the non-player object NPO is moved stepwise from the position before the arrangement changing of the non-player object NPO to the position after the arrangement changing of the non-player object NPO, in a predetermined period of time, and updates the non-player object motion data De. It should be noted that the movement speed and movement direction of each non-player object NPO in the first to third examples may be changed, depending on a state of a game (behavior of the non-player object NPO, conditions of road surface, influences from the player object PO and other non-player objects NPO, etc.).

Next, the control unit 31 performs a process of setting a virtual camera (step S138), and proceeds to the next step. For example, the control unit 31 moves the position of a virtual camera for generating a display image, based on the positions of the player object PO and the non-player objects NPO, and updates the virtual camera setting data Dg based on the position and orientation after the movement of the virtual camera. For example, when the player object PO and the non-player objects NPO are traveling in a formation, the control unit 31 moves the virtual camera to the front of an object leading the formation in the traveling direction along the course so that an image of the object as viewed from the front of the object is generated with the gaze point of the virtual camera placed on the object, and updates the virtual camera setting data Dg based on the position and orientation after the movement of the virtual camera. When the virtual camera setting changing process of step S134 is being executed, the control unit 31 maintains the settings of the virtual camera based on that process. When a formation is being changed by the formation changing process of step S132, or when the object arrangement of a formation is being changed by the object arrangement changing process of step S135, the control unit 31 moves the virtual camera such that the same object continues to be positioned at the gaze point, and updates the virtual camera setting data Dg based on the position and orientation after the movement of the virtual camera.

Next, the control unit 31 performs a process of calculating points (step S139), and ends the subroutine. For example, when the player object PO as it is moving in a formation performs a motion for which points are to be added, the control unit 31 adds points set for the motion, and updates the point value indicated by the point data Dh. For example, the control unit 31 also adds points in response to the passage of the player object PO over a dash panel B provided on a course in the virtual space. The control unit 31 also adds points according to the travel state (e.g., flying, jumping, traveling underwater, drifting, traveling history, etc.) of the player object PO.

Referring back to FIG. 12, in step S106, the control unit 31 determines whether or not the player object PO has finished a race. If the player object PO has finished a race, the control unit 31 proceeds to step S107. Otherwise, i.e., if the player object PO has not yet finished a race, the control unit 31 proceeds to step S108.

In step S107, the control unit 31 performs a process of determining points, and proceeds to step S108. For example, the control unit 31 calculates and adds points that are acquired by the player object PO finishing a race, and updates the value of points indicated by the point data Dh. For example, in the first mode, the control unit 31 calculates points such that as the player object PO finishes a race in a higher place, the player object PO acquires a greater number of points, and in the second mode, the control unit 31 calculates points (e.g., points corresponding to fourth place in which the player object PO finishes) irrespective of the place in which the player object PO finishes a race. The control unit 31 also calculates points that are to be acquired when the player object PO finishes a race, in the first and second modes, based on the type or level of a vehicle (machine), equipment, parts, etc., of the player object PO used in a racing game. The control unit 31 also sets a situation of a sub-event (clearing, addition of acquired points, completion, etc.) based on a result (standing, the number of acquired points, completion or dropping out, etc.) of a racing game (sub-event) that the player object PO has finished. The control unit 31 may also newly permit an event for which playing/execution is previously not permitted (see FIG. 4), based on the number of acquired points possessed by the user or a change in the situation of a sub-event.

In step S108, the control unit 31 performs a display control process of generating and displaying a display image on the display unit 35, and proceeds to the next step. For example, the control unit 31 performs a process of generating a display image corresponding to the result of each step based on the player object motion data Dd, the non-player object motion data De, the item position data Dj, etc., and displaying the display image on the display unit 35. The control unit 31 also sets a virtual camera for generating a display image based on the virtual camera setting data Dg. It should be noted that when the modes can be changed in the current game situation, the control unit 31 may display an image for receiving a mode change operation (e.g., an operation button image) as a portion of a display image. When the operation data Da indicates the user's operation of shooting a display image, the control unit 31 may temporarily display a still image of the display image, and store the still image into the storage unit 32. In a game situation in which the result of a racing game is displayed, the control unit 31 may also generate a display image that displays standings in a race, and reports acquired points calculated in step S107, a state of a sub-event, etc.

Next, the control unit 31 determines whether or not to end the game process (step S109). A condition under which the game process is ended is, for example, that a condition for ending the game process is satisfied, that an operation for ending the game process has been performed by the user, etc. If the control unit 31 continues the game process, the control unit 31 returns to and repeats step S102. If the control unit 31 ends the game process, the control unit 31 ends the process of the flowchart.

Thus, in the information processing system 1 that performs the above game process, the first mode in which the motion of the player object PO is controlled according to the user's operation, and the second mode in which the motion of the player object PO is automatically controlled, are prepared for a racing game that employs one game stage, and therefore, one game stage can be more casually played.

Although in the above non-limiting example, the touch panel covering the display screen of the display unit 35 is used as a non-limiting example of the input unit 34 for detecting a touch operation, other devices such as a touch pad may be used. As a non-limiting example, in the case where a game system is used in which an operation is performed using a separate controller while viewing a game image displayed on a stationary monitor, a touch operation may be performed using a touch pad included in the controller.

Although in the above non-limiting example, the player object PO and the non-player objects NPO travel in a formation that is a non-limiting example of a pattern for maintaining a relative positional relationship between the player object PO and the non-player objects NPO in the second mode, the positional relationship may be set using other patterns. For example, the relative positional relationship between the player object PO and the non-player objects NPO may be managed using an arrangement pattern such as a formation, tactical formation, or formation flying.

Although in the above non-limiting example, points with which playing/execution of each tour event is permitted is used as a non-limiting example of a reward given to the user, other rewards may be given. For example, experience points of the user or the player object PO, a game item that the user is allowed to use in the above racing game or other games, a game parameter that the user is allowed to use, etc., may be given to the user as a reward.

Although the information processing system 1 includes the server 200 that can communicate with the information processing apparatus 3, the information processing apparatus 3 may perform the game process alone without connecting to the server 200. In particular, a racing game in which the user operates the player object PO can be executed without through the server 200, and therefore, can be carried out by an internal process of the information processing apparatus 3. In addition, even in a racing game in which a plurality of information processing apparatuses 3 participate, the game process may be carried out by communication between the information processing apparatuses 3 or between the information processing apparatuses 3 and other apparatuses without through the server 200. A portion of the process of performing a racing game according to the user's operation of the player object PO may be executed by the server 200. As a result, processes in a plurality of information processing apparatuses 3 can be managed by the server 200 in a centralized fashion.

In the foregoing, the information process and the communication process are performed in the information processing apparatus 3. Alternatively, at least a portion of the steps in the processes may be performed in another apparatus. For example, steps in the processes may be executed in cooperation with the server 200 or another apparatus (e.g., another server, another game apparatus, or another mobile terminal) that can communicate with the information processing apparatus 3. Thus, processes similar to the above processes can be performed by the server 200 or another apparatus performing a portion of the steps in the processes. The above processes may be executed by a single processor or a plurality of cooperating processors included in an information processing system including at least one information processing apparatus. In the above non-limiting example, the processes shown in the flowcharts are performed by the control unit 31 of the information processing apparatus 3 executing a predetermined program. Alternatively, all or a portion of the above processes may be performed by a dedicated circuit included in the information processing apparatus 3.

Here, according to the above non-limiting variation, this non-limiting example can be implanted in a so-called cloud computing system form or distributed wide-area or local-area network system form. For example, in the distributed local-area network system, the above processes can be executed by cooperation between a stationary information processing apparatus (stationary game apparatus) and a mobile information processing apparatus (handheld game apparatus). It should be noted that, in these system forms, each of the above steps may be performed by any suitable one of the apparatuses, and this non-limiting example may be implemented by assigning the steps to the apparatuses in any suitable manner.

The order of steps, setting values, conditions for determination, etc., used in the above information process are merely for illustrative purposes, and other order of steps, setting values, conditions for determination, etc., may be used to implement this non-limiting example.

The above information processing program may be supplied to the information processing apparatus 3 not only through an external storage medium, such as an external memory, but also through a wired or wireless communication line. The program may be previously stored in a non-volatile storage device in the information processing apparatus 3. Examples of an information storage medium storing the program may include non-volatile memories, and in addition, CD-ROMs, DVDs, optical disk-shaped storage media similar thereto, flexible disks, hard disks, magneto-optical disks, and magnetic tapes. The information storage medium storing the program may be a volatile memory storing the program. Such a storage medium may be said as a storage medium that can be read by a computer, etc. (computer-readable storage medium, etc.). For example, the above various functions can be provided by causing a computer, etc., to read and execute programs from these storage media.

While several non-limiting example systems, methods, devices, and apparatuses have been described above in detail, the foregoing description is in all aspects illustrative and not restrictive. It should be understood that numerous other modifications and variations can be devised without departing from the spirit and scope of the appended claims. It is, therefore, intended that the scope of the present technology is limited only by the appended claims and equivalents thereof. It should be understood that those skilled in the art could carry out the literal and equivalent scope of the appended claims based on the description of this non-limiting example embodiment and common technical knowledge. It should be understood throughout the present specification that expression of a singular form includes the concept of their plurality unless otherwise mentioned. Specifically, articles or adjectives for a singular form (e.g., "a," "an," "the," etc., in English) include the concept of their plurality unless otherwise mentioned. It should also be understood that the terms as used herein have definitions typically used in the art unless otherwise mentioned. Thus, unless otherwise defined, all scientific and technical terms have the same meanings as those generally used by those skilled in the art to which this non-limiting example embodiment pertain. If there is any inconsistency or conflict, the present specification (including the definitions) shall prevail.

As described above, this non-limiting example is useful for, for example, information processing programs, information processing apparatuses, information processing systems, and information processing methods, etc., for the purpose of allowing more casual game playing on a game stage.

What is claimed is:

1. A non-transitory computer-readable storage medium having stored therein instructions that, when executed by a computer of an information processing apparatus that controls a racing game employing a virtual game stage, cause the computer to perform operations comprising:
   determining whether the racing game on the virtual game stage is to be executed in a first mode or in a second mode, according to a user's selection operation;
   controlling a movement of a player object on the virtual game stage according to the user's movement operation, and automatically controlling a movement of a non-player object on the virtual game stage, in the first mode;
   changing positions of the player object and the non-player object on the virtual game stage according to the user's position changing operation such that a relative positional relationship between the player object and the non-player object on the virtual game stage for use in the second mode is a first positional relationship;
   automatically controlling movements of the player object and the non-player object on the virtual game stage while maintaining the first positional relationship, in the second mode; and
   giving a reward to the user, based on a game event based on the position of the player object in a progression and/or result of the racing game on the virtual game stage in each of the first and second modes,
   wherein the user's operation in the first mode is the movement operation, and
   wherein a position and/or orientation of a virtual camera for generating the racing game image are changed according to the user's operation in the second mode.

2. The non-transitory computer-readable storage medium according to claim 1, wherein in each of the first and second modes, the reward is determined based on the place in which a race is finished as the result of the racing game on the virtual game stage as the game event.

3. The non-transitory computer-readable storage medium according to claim 2, wherein the relative positional relationship is the first positional relationship, and the position of the player object is changed to a leading position in a traveling direction in the first positional relationship, according to the user's operation.

4. The non-transitory computer-readable storage medium according to claim 1, wherein in the first mode, the reward is determined based on the place in which a race is finished as the result of the racing game on the virtual game stage as the game event, and in the second mode, the reward is determined irrespective of the place in which a race is finished.

5. The non-transitory computer-readable storage medium according to claim 1, wherein the progression and/or result of the racing game on the game stage are evaluated using the same criterion in both of the first and second modes, and the reward is given according to a result of the evaluation.

6. A non-transitory computer-readable storage medium having stored therein instructions that, when executed by a computer of an information processing apparatus that controls a racing game employing a virtual game stage, cause the computer to perform operations comprising:
   determining whether the racing game on the virtual game stage is to be executed in a first mode or in a second mode, according to a user's selection operation;

controlling a movement of a player object on the virtual game stage according to the user's movement operation, and automatically controlling a movement of a non-player object on the virtual game stage, in the first mode;

changing positions of the player object and the non-player object on the virtual game stage according to the user's position changing operation such that a relative positional relationship between the player object and the non-player object on the virtual game stage for use in the second mode is a first positional relationship;

automatically controlling movements of the player object and the non-player object on the virtual game stage while maintaining the first positional relationship, in the second mode; and giving a reward to the user, based on a game event based on the position of the player object in a progression and/or result of the racing game on the virtual game stage in each of the first and second modes, wherein the relative positional relationship between the player object and the non-player object is set to one selected from a plurality of preset patterns, according to the position changing operation.

7. The non-transitory computer-readable storage medium according to claim 6, wherein the position of the player object in the selected pattern is changed according to the user's operation.

8. The non-transitory computer-readable storage medium according to claim 6, wherein one of the player object and the non-player object in the selected pattern that is located at a position related to a gaze point of a virtual camera is set, and the position of the set object in the pattern is changed, according to the user's operation.

9. The non-transitory computer-readable storage medium according to claim 6, wherein the position of a designated one of the player object and the non-player object in the selected pattern is changed according to the user's operation such that the designated one is located at a leading position in the pattern in a traveling direction.

10. The non-transitory computer-readable storage medium according to claim 6, wherein when the relative positional relationship between the player object and the non-player object is changed to another positional relationship having a different pattern, the position of each object is changed stepwise in a period of time.

11. The non-transitory computer-readable storage medium according to claim 6, wherein the instructions cause the computer to perform further operations comprising:

determining whether or not the virtual game stage has been cleared, and as with game playing in the first mode, game playing in the second mode is evaluated, and it is determined whether or not the virtual game stage of the game playing has been cleared.

12. An information processing apparatus for controlling a racing game employing a virtual game stage, comprising:

at least one processor configured to control the information processing apparatus to at least:

determine whether the racing game on the virtual game stage is to be executed in a first mode or in a second mode, according to a user's selection operation;

control a movement of a player object on the virtual game stage according to the user's movement operation, and automatically control a movement of a non-player object on the virtual game stage, in the first mode;

change positions of the player object and the non-player object on the virtual game stage according to the user's position changing operation such that a relative positional relationship between the player object and the non-player object on the virtual game stage for use in the second mode is a first positional relationship;

automatically control movements of the player object and the non-player object on the virtual game stage while maintaining the first positional relationship, in the second mode; and give a reward to the user, based on a game event based on the position of the player object in a progression and/or result of the racing game on the virtual game stage in each of the first and second modes, wherein the user's operation in the first mode is the movement operation, and wherein a position and/or orientation of a virtual camera for generating the racing game image are changed according to the user's operation in the second mode.

13. An information processing system for controlling a racing game employing a virtual game stage, comprising:

at least one processor configured to control the information processing system to at least:

determine whether the racing game on the virtual game stage is to be executed in a first mode or in a second mode, according to a user's selection operation;

control a movement of a player object on the virtual game stage according to the user's movement operation, and automatically control a movement of a non-player object on the virtual game stage, in the first mode;

change positions of the player object and the non-player object on the virtual game stage according to the user's position changing operation such that a relative positional relationship between the player object and the non-player object on the virtual game stage for use in the second mode is a first positional relationship;

automatically control movements of the player object and the non-player object on the virtual game stage while maintaining the first positional relationship, in the second mode; and give a reward to the user, based on a game event based on the position of the player object in a progression and/or result of the racing game on the virtual game stage in each of the first and second modes, wherein the user's operation in the first mode is the movement operation, and wherein a position and/or orientation of a virtual camera for generating the racing game image are changed according to the user's operation in the second mode.

14. An information processing method for controlling a racing game employing a virtual game stage, the method comprising:

determining whether the racing game on the virtual game stage is to be executed in a first mode or in a second mode, according to a user's selection operation;

controlling a movement of a player object on the virtual game stage according to the user's movement operation, and automatically controlling a movement of a non-player object on the virtual game stage, in the first mode;

changing positions of the player object and the non-player object on the virtual game stage according to the user's position changing operation such that a relative positional relationship between the player object and the non-player object on the virtual game stage for use in the second mode is a first positional relationship;

automatically controlling movements of the player object and the non-player object on the virtual game stage while maintaining the first positional relationship, in the second mode; and giving a reward to the user, based on a game event based on the position of the player object in a progression and/or result of the racing game on the virtual game stage in each of the first and second modes, wherein the user's operation in the first mode is the movement operation, and wherein a position and/or orientation of a virtual camera for generating the racing game image are changed according to the user's operation in the second mode.

15. An information processing apparatus for controlling a racing game employing a virtual game stage, comprising:

at least one processor configured to control the information processing apparatus to at least:

determine whether the racing game on the virtual game stage is to be executed in a first mode or in a second mode, according to a user's selection operation;

control a movement of a player object on the virtual game stage according to the user's movement operation, and automatically control a movement of a non-player object on the virtual game stage, in the first mode;

change positions of the player object and the non-player object on the virtual game stage according to the user's position changing operation such that a relative positional relationship between the player object and the non-player object on the virtual game stage for use in the second mode is a first positional relationship;

automatically control movements of the player object and the non-player object on the virtual game stage while maintaining the first positional relationship, in the second mode; and give a reward to the user, based on a game event based on the position of the player object in a progression and/or result of the racing game on the virtual game stage in each of the first and second modes, wherein the relative positional relationship between the player object and the non-player object is set to one selected from a plurality of preset patterns, according to the position changing operation.

16. An information processing system for controlling a racing game employing a virtual game stage, comprising:

at least one processor configured to control the information processing system to at least:

determine whether the racing game on the virtual game stage is to be executed in a first mode or in a second mode, according to a user's selection operation;

control a movement of a player object on the virtual game stage according to the user's movement operation, and automatically control a movement of a non-player object on the virtual game stage, in the first mode;

change positions of the player object and the non-player object on the virtual game stage according to the user's position changing operation such that a relative positional relationship between the player object and the non-player object on the virtual game stage for use in the second mode is a first positional relationship;

automatically control movements of the player object and the non-player object on the virtual game stage while maintaining the first positional relationship, in the second mode; and give a reward to the user, based on a game event based on the position of the player object in a progression and/or result of the racing game on the virtual game stage in each of the first and second modes, wherein the relative positional relationship between the player object and the non-player object is set to one selected from a plurality of preset patterns, according to the position changing operation.

17. An information processing method for controlling a racing game employing a virtual game stage, the method comprising:

determining whether the racing game on the virtual game stage is to be executed in a first mode or in a second mode, according to a user's selection operation;

controlling a movement of a player object on the virtual game stage according to the user's movement operation, and automatically controlling a movement of a non-player object on the virtual game stage, in the first mode;

changing positions of the player object and the non-player object on the virtual game stage according to the user's position changing operation such that a relative positional relationship between the player object and the non-player object on the virtual game stage for use in the second mode is a first positional relationship;

automatically controlling movements of the player object and the non-player object on the virtual game stage while maintaining the first positional relationship, in the second mode; and giving a reward to the user, based on a game event based on the position of the player object in a progression and/or result of the racing game on the virtual game stage in each of the first and second modes, wherein the relative positional relationship between the player object and the non-player object is set to one selected from a plurality of preset patterns, according to the position changing operation.

18. The method according to claim 17, wherein one of the player object and the non-player object in the selected pattern that is located at a position related to a gaze point of a virtual camera is set, and the position of the set object in the pattern is changed, according to the user's operation.

19. The method according to claim 17, wherein the position of a designated one of the player object and the non-player object in the selected pattern is changed according to the user's operation such that the designated one is located at a leading position in the pattern in a traveling direction.

20. The method according to claim 17, wherein when the relative positional relationship between the player object and the non-player object is changed to another positional relationship having a different pattern, the position of each object is changed stepwise in a period of time.

* * * * *